(12) United States Patent
Iwai et al.

(10) Patent No.: US 9,932,883 B2
(45) Date of Patent: Apr. 3, 2018

(54) SPARK-IGNITION DIRECT-INJECTION ENGINE

(71) Applicant: MAZDA MOTOR CORPORATION, Hiroshima (JP)

(72) Inventors: Kouhei Iwai, Hiroshima (JP); Masahisa Yamakawa, Hiroshima (JP); Kazuhiro Nagatsu, Hiroshima (JP); Takashi Youso, Hiroshima (JP); Keiji Araki, Hatsukaichi (JP)

(73) Assignee: MAZDA MOTOR CORPORATION, Hiroshima (JP)

( * ) Notice: Subject to any disclaimer, the term of this patent is extended or adjusted under 35 U.S.C. 154(b) by 222 days.

(21) Appl. No.: 14/395,902

(22) PCT Filed: Aug. 26, 2013

(86) PCT No.: PCT/JP2013/005033
§ 371 (c)(1),
(2) Date: Oct. 21, 2014

(87) PCT Pub. No.: WO2014/034087
PCT Pub. Date: Mar. 6, 2014

(65) Prior Publication Data
US 2015/0114342 A1 Apr. 30, 2015

(30) Foreign Application Priority Data
Aug. 29, 2012 (JP) ................................ 2012-188738

(51) Int. Cl.
*F02B 11/02* (2006.01)
*F02B 23/10* (2006.01)
(Continued)

(52) U.S. Cl.
CPC ............ *F02B 11/02* (2013.01); *F02B 23/101* (2013.01); *F02B 29/0418* (2013.01);
(Continued)

(58) Field of Classification Search
USPC ......................... 701/108, 110, 113, 101–105
See application file for complete search history.

(56) References Cited

U.S. PATENT DOCUMENTS 5,357,936 A 10/1994 Hitomi et al.
5,979,398 A 11/1999 Yanagihara
(Continued)

FOREIGN PATENT DOCUMENTS

CN 1576552 A 2/2005
CN 101889135 A 11/2010
(Continued)

OTHER PUBLICATIONS

International Search Report; PCT/JP2013/005033; dated Nov. 26, 2013.

*Primary Examiner* — Hung Q Nguyen
*Assistant Examiner* — Brian P Monahon
(74) *Attorney, Agent, or Firm* — Studebaker & Brackett PC

(57) ABSTRACT

A controller injects fuel into a cylinder at a high fuel pressure of 30 MPa or higher, at least in a period between a terminal stage of a compression stroke and an initial stage of an expansion stroke when an operating mode of an engine body is at least in a first specified sub-range of a low load range, and at least in a second specified sub-range of a high load range. The controller sets an EGR ratio in the first specified sub-range to be higher than an EGR ratio in the second specified sub-range, and advances start of fuel injection in the first specified sub-range to start of fuel injection in the second specified sub-range.

16 Claims, 24 Drawing Sheets

(51) Int. Cl.

| | | |
|---|---|---|
| *F02B 29/04* | (2006.01) | |
| *F02D 21/08* | (2006.01) | |
| *F02D 13/02* | (2006.01) | |
| *F02D 41/00* | (2006.01) | |
| *F02D 37/02* | (2006.01) | |
| *F02D 41/30* | (2006.01) | |
| *F02D 41/40* | (2006.01) | |
| *F02P 5/15* | (2006.01) | |
| *F02P 15/08* | (2006.01) | |
| *F02M 26/25* | (2016.01) | |
| *F02M 26/33* | (2016.01) | |

(52) U.S. Cl.
CPC ..... *F02D 13/0207* (2013.01); *F02D 13/0261* (2013.01); *F02D 21/08* (2013.01); *F02D 37/02* (2013.01); *F02D 41/0057* (2013.01); *F02D 41/3017* (2013.01); *F02D 41/3023* (2013.01); *F02D 41/3035* (2013.01); *F02D 41/401* (2013.01); *F02M 26/25* (2016.02); *F02M 26/33* (2016.02); *F02P 5/1516* (2013.01); *F02P 15/08* (2013.01); *F02D 41/402* (2013.01); *F02D 2041/3052* (2013.01); *Y02T 10/125* (2013.01); *Y02T 10/128* (2013.01); *Y02T 10/146* (2013.01); *Y02T 10/18* (2013.01); *Y02T 10/44* (2013.01); *Y02T 10/46* (2013.01); *Y02T 10/47* (2013.01)

(56) References Cited

U.S. PATENT DOCUMENTS

| | | | | |
|---|---|---|---|---|
| 6,062,189 | A * | 5/2000 | Kaneko | F02B 17/005 123/295 |
| 6,295,973 | B1 * | 10/2001 | Yang | F02B 1/12 123/543 |
| 7,237,527 | B2 * | 7/2007 | Pontoppidan | F02M 61/1806 123/298 |
| 8,838,364 | B2 * | 9/2014 | Nagatsu | F02D 13/0234 123/294 |
| 2001/0015192 | A1 | 8/2001 | Urushihara et al. | |
| 2004/0011323 | A1 | 1/2004 | Hilger et al. | |
| 2004/0069267 | A1 | 4/2004 | Hilger et al. | |
| 2005/0005903 | A1 | 1/2005 | Maitani et al. | |
| 2005/0022755 | A1 * | 2/2005 | Hitomi | F01L 1/185 123/58.8 |
| 2005/0224045 | A1 * | 10/2005 | Kuzuyama | F02D 13/0203 123/305 |
| 2005/0279321 | A1 | 12/2005 | Crawford et al. | |
| 2006/0254560 | A1 | 11/2006 | Mann et al. | |
| 2007/0227503 | A1 | 10/2007 | Hitomi et al. | |
| 2007/0240653 | A1 * | 10/2007 | Petridis | F01L 13/0036 123/90.16 |
| 2008/0127952 | A1 * | 6/2008 | Hatamura | F01N 13/107 123/568.11 |
| 2008/0162020 | A1 | 7/2008 | Itoga et al. | |
| 2008/0283006 | A1 * | 11/2008 | Sutherland | F01L 13/0015 123/90.15 |
| 2009/0025697 | A1 * | 1/2009 | Hatamura | F02B 23/0672 123/568.11 |
| 2009/0159045 | A1 | 6/2009 | Hitomi et al. | |
| 2009/0248271 | A1 * | 10/2009 | Kuzuyama | F02B 37/16 701/103 |
| 2009/0272363 | A1 * | 11/2009 | Yun | F02B 1/12 123/295 |
| 2010/0229831 | A1 | 9/2010 | Hernier et al. | |
| 2010/0242901 | A1 * | 9/2010 | Seto | F02M 26/01 123/299 |
| 2011/0005496 | A1 * | 1/2011 | Hiraya | F02D 15/02 123/48 B |
| 2011/0067679 | A1 * | 3/2011 | Hitomi | F02D 41/3035 123/564 |
| 2011/0108005 | A1 * | 5/2011 | Nishizawa | F02M 55/025 123/469 |

FOREIGN PATENT DOCUMENTS

| | | |
|---|---|---|
| DE | 698 12 771 T2 | 12/2003 |
| EP | 0978643 A2 | 2/2000 |
| JP | 2001-207887 A | 8/2001 |
| JP | 2002-285844 A | 10/2002 |
| JP | 2006-220155 A | 8/2006 |
| JP | 2006-523795 A | 10/2006 |
| JP | 2007-154859 A | 6/2007 |
| JP | 2007-292050 A | 11/2007 |
| JP | 2008-163793 A | 7/2008 |
| JP | 2009-091994 A | 4/2009 |
| JP | 2012-211543 A | 11/2012 |

* cited by examiner

SPARK-IGNITION DIRECT-INJECTION ENGINE

TECHNICAL FIELD

The present disclosure relates to spark-ignition direct-injection engines.

BACKGROUND ART

In order to improve theoretical thermal efficiency of a spark ignition gasoline engine, increasing the geometrical compression ratio of the engine is effective. For example, Patent Document 1 shows a high compression spark-ignition direct-injection engine with a geometrical compression ratio of 14 or higher. An engine with a high compression ratio is subject to knocking, when the operation range is in a low-speed, and high-load range including a full load range. Patent Document 1 also teaches adjusting the time of closing an intake valve to reduce the effective compression ratio in the low-speed, high-load range. The ignition time is advanced by reducing the knocking as much as possible, thereby increasing the engine torque.

For example, as shown in Patent Document 2, the combustion type of compressing and igniting a lean air-fuel mixture is known as a technique improving both of the exhaust emission and the thermal efficiency. In an engine performing the compression ignition combustion, increasing the geometrical compression ratio improves both of the compression end pressure and the compression end temperature, and is thus advantageous in stabilizing the compression ignition combustion. On the other hand, in a low load operation range, although the compression ignition combustion is possible, preignition combustion occurs, which rapidly raises the pressure (dP/dt) with an increase in the engine load. Due to noise vibration harshness (NVH) constraints, the range, in which the compression ignition combustion is performed, is difficult to expand to the high load side. As shown in Patent Document 2, even the engine performing the compression ignition combustion do not usually perform the compression ignition combustion but spark ignition combustion by driving a spark plug in a higher load operation range.

Patent Document 3 shows an engine switching between compression ignition combustion and spark ignition combustion in accordance with the operating mode of the engine, and teaches introducing EGR gas into a cylinder in transition from the compression ignition combustion to the spark ignition combustion and enriching the air-fuel ratio as compared to the stoichiometric air-fuel ratio, thereby reducing knocking.

CITATION LIST

Patent Document

PATENT DOCUMENT 1: Japanese Unexamined Patent Publication No. 2007-292050
PATENT DOCUMENT 2: Japanese Unexamined Patent Publication No. 2007-154859
PATENT DOCUMENT 3: Japanese Unexamined Patent Publication No. 2009-91994

SUMMARY OF THE INVENTION

Technical Problem

A spark ignition gasoline engine with a high compression ratio is advantageous in improving thermal efficiency. The engine is however subject to abnormal combustion such as preignition and knocking (i.e., end gas knock) particularly when the operating mode of the engine is in a low-speed, middle and high-load ranges.

An engine performing compression ignition combustion switches the combustion to spark ignition combustion in a high load operation range due to NVH constraints. However, there is a demand to execute the compression ignition combustion with excellent exhaust emission and thermal efficiency in a higher load range as much as possible.

The technique disclosed therein was made in view of the problems. It is an objective of the present disclosure to expand the range, in which compression ignition combustion is performed, to the high load side, and reduce abnormal combustion in the range, in which spark ignition combustion is performed, in a spark-ignition direct-injection engine with a relatively high geometrical compression ratio of, for example, 15 or higher.

Solution to the Problem

Preignition is auto-ignition reaction in accordance with compression of an unburnt part of an air-fuel mixture in a compression stroke. Knocking is auto-ignition reaction in accordance with compression of the unburnt part of the air-fuel mixture caused by expansion of the burnt part of the air-fuel mixture in the combustion of the air-fuel mixture. Conventional engines injecting fuel in an intake stroke need a long reactive time of an unburnt air-fuel mixture from the start of fuel injection to the end of combustion. This long reactive time of the unburnt air-fuel mixture is one of the causes of abnormal combustion such as preignition and/or knocking. The present inventors found that injecting fuel into each cylinder at a relatively high fuel pressure at a time near the compression top dead center in a high load range, in which spark ignition combustion is performed, is advantageous in reducing a reactive time of an unburnt air-fuel mixture, thereby reducing abnormal combustion.

The present inventors also found that the injection type of injecting fuel into a cylinder at a high fuel pressure at a time near the compression top dead center leads to stable compression ignition combustion in an expansion stroke in a high load range in which the compression ignition combustion is performed. The present inventors found the fact that the compression ignition combustion in the expansion stroke is advantageous in reducing a rapid pressure rise in the cylinder, and have completed the technique disclosed herein.

Specifically, a spark-ignition direct-injection engine according to the present disclosure includes an engine body including a cylinder with a geometrical compression ratio of 15 or higher; a fuel injection valve configured to inject fuel into the cylinder; a fuel pressure setting mechanism configured to set a pressure of the fuel injected by the fuel injection valve; a spark plug facing an inside of the cylinder and configured to ignite an air-fuel mixture in the cylinder; an exhaust recirculation system configured to introduce exhaust gas into the cylinder; and a controller configured to operate the engine body by controlling at least the fuel injection valve, the fuel pressure setting mechanism, the spark plug, and the exhaust recirculation system.

The controller operates the engine body by compression ignition combustion of compressing and igniting the air-fuel mixture in the cylinder, when an operating mode of the engine body is in a predetermined low load range, and activates the spark plug at predetermined timing to operate the engine body by spark ignition combustion, when the operating mode of the engine body is in a high load range, in which a load is higher than that in the low load range. The controller sets the pressure of the fuel to a high fuel pressure of 30 MPa or higher using the fuel pressure setting mechanism, and drives the fuel injection valve to inject the fuel into the cylinder at least in a period between a terminal stage of a compression stroke and an initial stage of an expansion stroke, when the operating mode of the engine body is at least in a predetermined first specified sub-range of the low load range including a boundary between the low load range and the high load range. The controller sets the pressure of the fuel to the high fuel pressure of 30 MPa or higher using the fuel pressure setting mechanism, drives the fuel injection valve to inject the fuel into the cylinder at least in the period between the terminal stage of the compression stroke and the initial stage of the expansion stroke, and drives the spark plug after an end of fuel injection to perform the spark ignition of the air-fuel mixture in the cylinder, when the operating mode of the engine body is at least in a predetermined second specified sub-range of the high load range including a full load range.

The controller sets an EGR ratio, which is a ratio of an amount of the exhaust gas to an entire amount of gas in the cylinder, in the first specified sub-range of the low load range to be higher than an EGR ratio in the second specified sub-range of the high load range by controlling the exhaust recirculation system, and advances start of the fuel injection in the first specified sub-range to start of the fuel injection in the second specified sub-range.

The geometrical compression ratio of the engine body may range from 15 to, for example, 20, both inclusive.

The "terminal stage of a compression stroke" may be a terminal stage, where the compression stroke is divided into three of initial, middle, and terminal stages. Similarly, the "initial stage of an expansion stroke" may be an initial stage where the expansion stroke is divided into three of initial, middle, and terminal stages.

The exhaust recirculation system includes an external EGR system configured to recirculate the exhaust gas to an intake side via the EGR passage, and an internal EGR system configured to confine the exhaust gas in the cylinder or reintake the exhaust gas exhausted to an intake or exhaust port.

When the operation range of the engine body is in a relatively low load range, the engine body is operated by the compression ignition combustion of compressing and igniting the air-fuel mixture in the cylinder. Since the engine body has the high geometrical compression ratio of 15 or higher, the compression end pressure and the compression end temperature rise. The high compression end pressure and the high compression end temperature stabilize the compression ignition combustion.

On the other hand, the pressure rapidly rises in the compression ignition combustion, with the increasing load of the engine body. With the above-described configuration, the fuel is injected into the cylinder at least at the high fuel pressure of 30 MPa or higher, and at least in the period between the terminal stage of the compression stroke and the initial stage of the expansion stroke in the first specified sub-range of the low load range in which the compression ignition combustion is performed. The first specified sub-range is the highest load sub-range in the low load range including the boundary between the low load range and the high load range in which the spark ignition combustion is performed.

Increasing the fuel pressure increases the amount of the fuel injected per unit time. As compared to the low fuel pressure using the same amount of the injected fuel, the high fuel pressure shortens the period of injecting the fuel into the cylinder, that is, the injection period. This is advantageous in shortening the time from the start of the fuel injection to the compression ignition.

The high fuel pressure is also advantageous in atomizing fuel spray injected into the cylinder. By injecting the fuel into the cylinder at the high fuel pressure, the turbulence of the gas is increased and the turbulence of the gas energy is increased in the cylinder in which the piston is near the compression top dead center. This factor improves the mixing performance of the fuel spray in the cylinder when the piston is near the compression top dead center. This rapidly forms a relatively homogenous burnable air-fuel mixture.

As such, the fuel is injected into the cylinder at least in the period between the terminal stage of the compression stroke and the initial stage of the expansion stroke, thereby reducing preignition in the compression stroke. As described above, the relatively homogenous burnable air-fuel mixture is rapidly formed after the start of the fuel injection. Thus, the homogeneous mixture is reliably subjected to the compression ignition after the compression top dead center and is stably combusted in the expansion stroke. In the expansion stroke, motoring gradually reduces the pressure in the cylinder, thereby reducing pressure rise in the compression ignition combustion, and performing relatively slow combustion.

The fuel injection may be divided in the first specified sub-range. In this case, at least one of the plurality of times of the divided fuel injection may be a relatively late time between the terminal stage of the compression stroke and the initial stage of the expansion stroke.

In the first specified sub-range of the low load range, the exhaust recirculation system is controlled to introduce the exhaust gas (i.e., the EGR gas) into the cylinder. The compression ignition combustion in the expansion stroke becomes slower, which is advantageous in reducing a rapid pressure rise. This removes NVH constraints in the first specified sub-range to expand the range, in which the compression ignition combustion is performed, to the high load side.

On the other hand, when the operation range of the engine body is in a relatively high load range, the engine body is operated by the spark ignition combustion of burning the air-fuel mixture in the cylinder by the spark ignition. In the second specified sub-range of the high load range including the full load range, the fuel is injected into the cylinder at the high fuel pressure of 30 MPa or higher at least in the period between the terminal stage of the compression stroke and the initial stage of the expansion stroke, as in the first specified sub-range. The high fuel pressure shortens the time of injecting the fuel, and improves the mixing performance of the atomized fuel spray to form the burnable air-fuel mixture in a short time. This distinctive fuel injection may be performed in any sub-range other than the second specified sub-range.

Then, at a predetermined time after the end of the fuel injection, the spark plug is driven to perform the spark ignition of the air-fuel mixture into the cylinder. The ignition time may be a predetermined time, for example, after the compression top dead center.

As described above, injecting the fuel into the cylinder at the high fuel pressure increases the turbulence energy in the cylinder. However, since the injection time of the fuel is near the compression top dead center, the period between the start of the injection to the spark ignition is shortened, and the spark ignition combustion starts with the turbulence energy maintained high. This accelerates flame propagation and shortens the combustion period of the spark ignition combustion.

As such, in the second specified sub-range of the high load range, in which the spark ignition combustion is performed, injecting the fuel into the cylinder at the high fuel pressure and the relatively late time near the compression top dead center shortens the injection period, the mixture formation period, and the combustion period. Since the engine body has the high geometrical compression ratio, this engine is subject to abnormal combustion such as preignition and knocking in the second specified sub-range of the high load range. However, the above-described configuration shortens the reactive time of the air-fuel mixture, which is the sum of the injection period, the mixture formation period, and the combustion period, thereby effectively reducing the abnormal combustion such as the preignition and the knocking.

As compared to the fuel injection in the second specified sub-range of the high load range, the fuel injection in the first specified sub-range of the low load range is advanced. This is mainly because of the difference between the EGR ratio in the first specified sub-range of the low load range, and the EGR ratio in the second specified sub-range of the high load range. Specifically, the first specified sub-range is the relatively low load range in which the compression ignition combustion is performed. Thus, a large amount of the EGR gas can be introduced into the cylinder. Since the large amount of the EGR gas reduces the speed of the combustion, the start of the fuel injection can be advanced as much as possible, as long as abnormal combustion such as preignition is reduced. As a result, in the first specified sub-range, the period for forming the homogeneous mixture is increased to some extent to improve the ignitionability and the combustion stability, and the time of the compression ignition is retarded after the compression top dead center. The large amount of the EGR gas reduces the speed of the combustion and reduces a rapid pressure rise.

On the contrary, in the second specified sub-range is the relatively high load range in which the spark ignition combustion is performed. In view of the stability of the spark ignition combustion, a large amount of the EGR gas cannot be introduced into the cylinder. Thus, in the second specified sub-range, abnormal combustion is preferably reduced by retarding the start of the fuel injection as much as possible.

The present disclosure also provides a spark-ignition direct-injection engine including an engine body including a cylinder with a geometrical compression ratio of 15 or higher, and a piston reciprocally inserted in the cylinder, and having a crown surface with a recessed cavity; a fuel injection valve capable of injecting fuel into the cavity when the piston is near a compression top dead center; a fuel pressure setting mechanism configured to set a pressure of the fuel injected by the fuel injection valve; a spark plug facing an inside of the cylinder and configured to ignite an air-fuel mixture in the cylinder; an exhaust recirculation system configured to introduce exhaust gas into the cylinder; and a controller configured to operate the engine body by controlling at least the fuel injection valve, the fuel pressure setting mechanism, the spark plug, and the exhaust recirculation system.

The controller operates the engine body by compression ignition combustion of compressing and igniting the air-fuel mixture in the cylinder, when an operating mode of the engine body is in a predetermined low load range, and activates the spark plug at predetermined timing to operate the engine body by spark ignition combustion, when the operating mode of the engine body is in a high load range, in which a load is higher than that in the low load range. The controller sets the pressure of the fuel to a high fuel pressure of 30 MPa or higher using the fuel pressure setting mechanism, and drives the fuel injection valve at timing of injecting the fuel is injected into the cavity of the piston, when the operating mode of the engine body is at least in a predetermined first specified sub-range of the low load range including a boundary between the low load range and the high load range. The controller sets the pressure of the fuel to the high fuel pressure of 30 MPa or higher using the fuel pressure setting mechanism, drives the fuel injection valve at the timing of injecting the fuel into the cavity of the piston, and drives the spark plug after an end of fuel injection to perform the spark ignition of the air-fuel mixture in the cylinder, when the operating mode of the engine body is at least in a predetermined second specified sub-range of the high load range including a full load range.

The controller sets an EGR ratio, which is a ratio of an amount of the exhaust gas to an entire amount of gas in the cylinder, in the first specified sub-range of the low load range to be higher than an EGR ratio in the second specified sub-range of the high load range by controlling the exhaust recirculation system, and advances start of the fuel injection in the first specified sub-range to start of the fuel injection in the second specified sub-range.

In the first specified sub-range of the low load range, in which the engine body is operated by the compression ignition combustion, the fuel injection valve is driven, at least, at the high fuel pressure of 30 MPa or higher, at the timing of injecting the fuel into the cavity formed in the crown surface of the piston. As described above, the high fuel pressure shortens the fuel injection period, and accelerates the atomization of the fuel spraying. The fuel is injected into the cavity at the high fuel pressure, thereby strengthening the gas flow in the cavity. This rapidly forms a relatively homogenous air-fuel mixture. The timing of injecting the fuel into the cavity corresponds to the time when the piston is located near the compression top dead center. Thus, the relatively homogeneous air-fuel mixture is reliably compressed and ignited after the compression top dead center, and stably burnt in the expansion stroke.

Since the exhaust gas is introduced into the cylinder in the first specified sub-range of the low load range, the compression ignition combustion in the expansion stroke becomes slower, which is advantageous in reducing the rapid pressure rise.

As such, NHV constraints are removed in the first specified sub-range, the above-described configuration is advantageous in expanding the low load range, in which the compression ignition combustion is performed, to the high load side.

In particular, in this configuration, since the engine body has the high geometrical compression ratio of 15 or higher, the combustion chamber has a relatively small volume when the piston is near the compression top dead center. Injecting the fuel into the cavity at the high fuel pressure at this time increases the air utilization rate in the cavity, which is advantageous in rapidly forming the homogenous air-fuel mixture. That is, the ignitionability and the stability in the compression ignition combustion improve in the engine body with the high geometrical compression ratio.

In the second specified sub-range of the high load range, in which the engine body is operated by the spark ignition combustion, the fuel injection valve is driven at least at the high fuel pressure of 30 MPa or higher at the timing of injecting the fuel into the cavity formed in the crown surface of the piston. This shortens the fuel injection period, and accelerates the atomization of the fuel spraying. Furthermore, the gas flow in the cavity is strengthened to form the burnable air-fuel mixture in a short time. In addition, the spark ignition starts the combustion while maintaining the great turbulence energy in the cavity, thereby shortening the combustion period. As a result, the abnormal combustion such as the preignition and the knocking effectively reduces, while securing the combustion stability.

In the second specified sub-range of the high load range, in which spark ignition combustion is performed, injecting the fuel into the cavity at the high fuel pressure increases the air utilization rate in the cavity, and contributes to the stability in the spark ignition combustion in the engine body with the high geometrical compression ratio.

With this configuration, a relatively large amount of the EGR gas is introduced into the cylinder in the first specified sub-range of the low load range. This further advances the start of the fuel injection to form a more homogenous air-fuel mixture. As a result, the ignitionability and the combustion stability improve, and the rapid pressure rise reduces. In the second specified sub-range of the high load range, a relatively small amount of the EGR gas is introduced into the cylinder, and the start of the fuel injection is retarded as much as possible, thereby reducing the abnormal combustion.

The exhaust recirculation system may include an external EGR system configured to recirculate the exhaust gas into the cylinder via the EGR passage through which an exhaust passage of the engine body communicates to an intake passage, and an internal EGR system configured to recirculate the exhaust gas into the cylinder by opening and closing control of an intake valve and an exhaust valve of the engine body. The controller may introduce cooled exhaust gas into the cylinder via the EGR passage of the external EGR system in the first specified sub-range of the low load range.

Since the first specified sub-range is the relatively high load range, the temperature in the cylinder is relatively high, and the pressure rapidly rises in the compression ignition combustion. Thus, in the first specified sub-range, the cooled exhaust gas is introduced into the cylinder via the EGR passage of the external EGR system. This reduces the temperature rise in the cylinder to reduce abnormal combustion such as preignition and the rapid pressure rise in the compression ignition combustion.

The exhaust recirculation system may be capable of introducing, into the cylinder, cooled EGR gas obtained by cooling the exhaust gas, and hot EGR gas having a higher temperature than the cooled EGR gas. The controller may introduce at least the cooled EGR gas into the cylinder via the exhaust recirculation system in the first specified sub-range of the low load range, and introduce only the hot EGR gas into the cylinder via the exhaust recirculation system in a predetermined lowest load sub-range of the low load range, in which the load is lower than that in the first specified sub-range.

Similar to what has been described above, in the first specified sub-range under the relatively high load, the cooled EGR gas is introduced into the cylinder, thereby reducing the abnormal combustion such as preignition and reducing the rapid pressure rise in the compression ignition combustion. On the other hand, in the predetermined lowest load sub-range, in which the load is lower than that in the first specified sub-range, only the hot EGR gas is introduced into the cylinder. This raises the temperature in the cylinder, which is advantageous in improving the ignitionability in the compression ignition.

The controller may drive the fuel injection valve to inject the fuel at least in a period between an intake stroke and a middle of the compression stroke in a sub-range of the low load range other than the first specified sub-range, and in a high speed range of the high load range, in which a rotational speed is equal to or higher than a predetermined speed.

The sub-range of the low load range other than the first specified sub-range is a relatively low load sub-range of the low load range. In this sub-range, since the temperature in the cylinder is relatively low, there is no or less rapid pressure rise in the compression ignition combustion. Thus, in this sub-range, the fuel is injected at least in the period between the intake stroke and the middle of the compression stroke. In this case, the fuel is injected in the period when the intake flow is strong, and the mixture formation period is sufficiently long, thereby forming the homogenous air-fuel mixture. Also, the fuel is injected when the piston is positioned apart from the top dead center, thereby increasing the air utilization rate in the cylinder. As a result, the ignitionability in the compression ignition and the stability in the compression ignition combustion improve.

The fuel is injected at least in the period between the intake stroke and the middle of the compression stroke in the high speed range of the high load range, in which the spark ignition combustion is performed and the speed is equal to or higher than the predetermined speed. The reasons follow. Specifically, retarding the fuel injection is advantageous in reducing abnormal combustion in the low speed range of the engine, which requires a long actual time for changing a crank angle. However, in the high speed range of the engine, since a short actual time is required to change the crank angle, retarding the fuel injection is less advantageous in reducing the reactive time of the unburnt air-fuel mixture. When the injection time of the fuel is retarded near the compression top dead center, an air with a high specific heat ratio is compressed in the compression stroke, thereby largely increasing the compression end temperature, which is disadvantageous in reducing knocking.

The fuel is injected at least in the period between the intake stroke and the middle of the compression stroke in the high speed range of the high load range, in which the speed is equal to or higher than the predetermined speed. As a result, the gas containing the fuel is compressed in the compression stroke. Since this gas has a relatively low specific heat ratio, the temperature rise according to the compression of the gas in the cylinder decreases, thereby maintaining a low compression end temperature. As a result, the abnormal combustion effectively decreases in the high speed range of the high load range.

The controller may drive the fuel injection valve at timing of injecting at least part of the fuel injected into the cylinder out of the cavity of the piston in a sub-range of the low load range other than the first specified sub-range, and in a high speed range of the high load range, in which a rotational speed is equal to or higher than a predetermined speed.

The time of injecting at least part of the fuel injected into the cylinder out of the cavity of the piston is the time when the piston is positioned apart from the compression top dead center. This is equivalent to injecting the fuel in the period between the intake stroke and the middle of the compression stroke.

The fuel is injected at the time of injecting at least part of the fuel out of the cavity of the piston, thereby increasing the air utilization rate and forming a more homogenous air-fuel mixture in the relatively low load sub-range of the low load range other than the first specified sub-range. This improves the ignitionability in the compression ignition and the stability in the compression ignition combustion. In the high speed range of the high load range, the low compression end temperature is maintained, thereby reducing abnormal combustion.

The controller may set the pressure of the fuel to be lower than 30 MPa using the fuel pressure setting mechanism at least in the sub-range of the low load range other than the first specified sub-range.

The fuel injection in the period between the intake stroke and the middle of the compression stroke does not require the high fuel pressure of 30 MPa or higher. Thus, the fuel pressure is set low in at least the sub-range of the low load range other than the first specified sub-range. This reduces the amount of the energy for increasing the fuel pressure, which is advantageous in improving the fuel efficiency.

The fuel pressure setting mechanism may include a fuel pump driven by the engine body and configured to adjust the pressure of the fuel.

Then, as described above, in the range set to the low fuel pressure, the drive force of the engine body decreases with the decreasing drive force of the fuel pump, thereby improving the fuel efficiency.

The fuel injection valve may be located on a central axis of the cylinder and capable of radially injecting the fuel.

A multi-hole fuel injection valve increases the turbulence energy of the gas flow in the cylinder (or in the cavity) in injecting the fuel into the cylinder. Thus, when the geometrical compression ratio is set high. Accordingly, in the engine body including the combustion chamber with a relatively small volume when the piston is located in compression top dead center, the multi-hole fuel injection valve increases the air utilization rate. Therefore, the valve is advantageous in exhibiting the above-described effects and advantages.

Advantages of the Invention

As described above, this spark-ignition direct-injection engine has the first specified sub-range of the low load range in which the compression ignition combustion is performed, and the second specified sub-range of the high load range in which spark ignition combustion is performed. In each range, the fuel is injected into the cylinder at the high fuel pressure of 30 MPa or higher at least in the period between the terminal stage of the compression stroke and the initial stage of the expansion stroke. As a result, in the first specified sub-range, the rapid pressure rise due to the compression ignition combustion decreases, and expands the range, in which the compression ignition combustion is performed, to the high load side. On the other hand, in the second specified sub-range, abnormal combustion etc. decreases.

DESCRIPTION OF EMBODIMENTS

Figure 1:
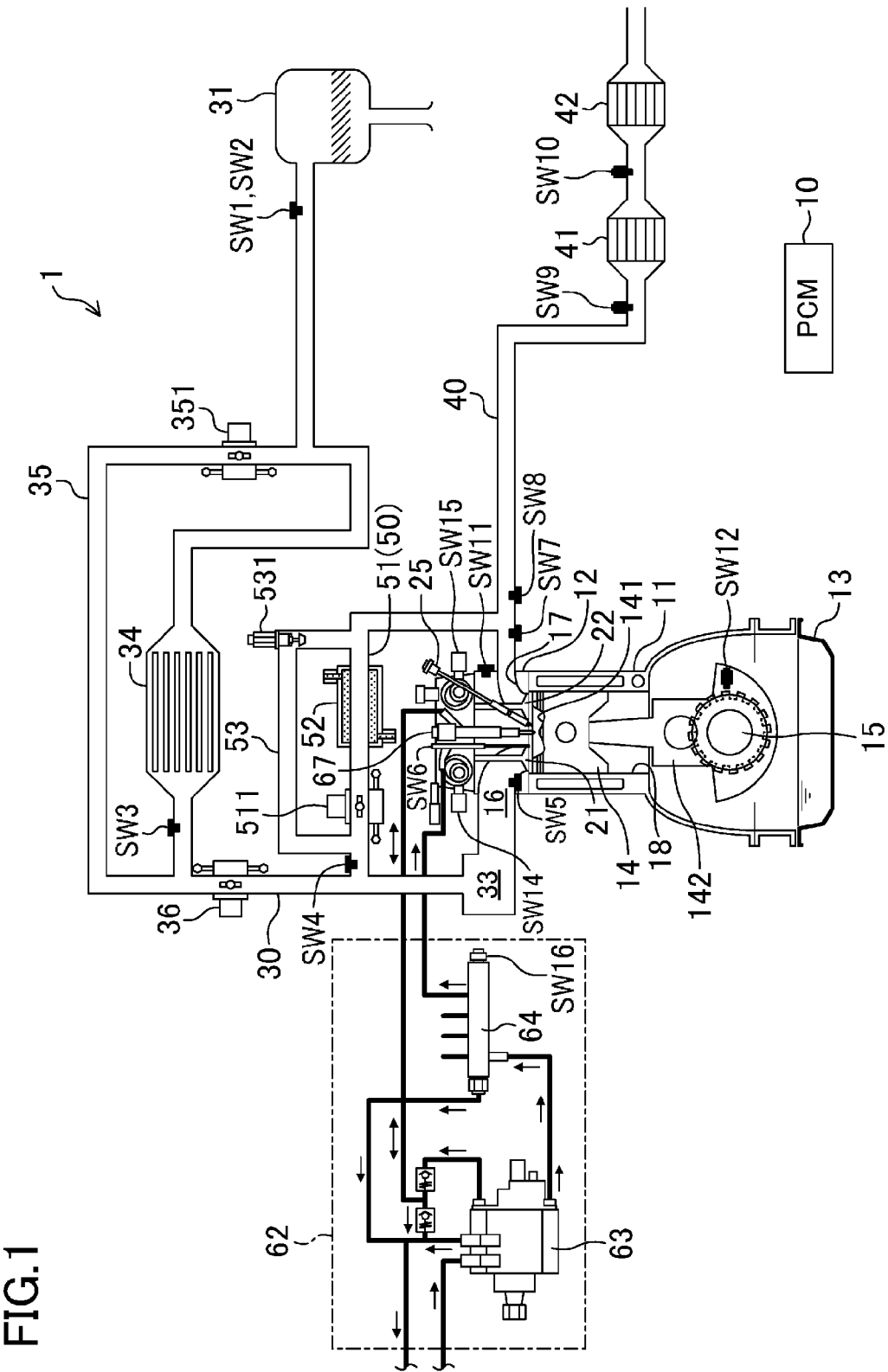
FIG. 1 is a schematic view illustrating the structure of a spark-ignition direct-injection engine.
Figure 2:
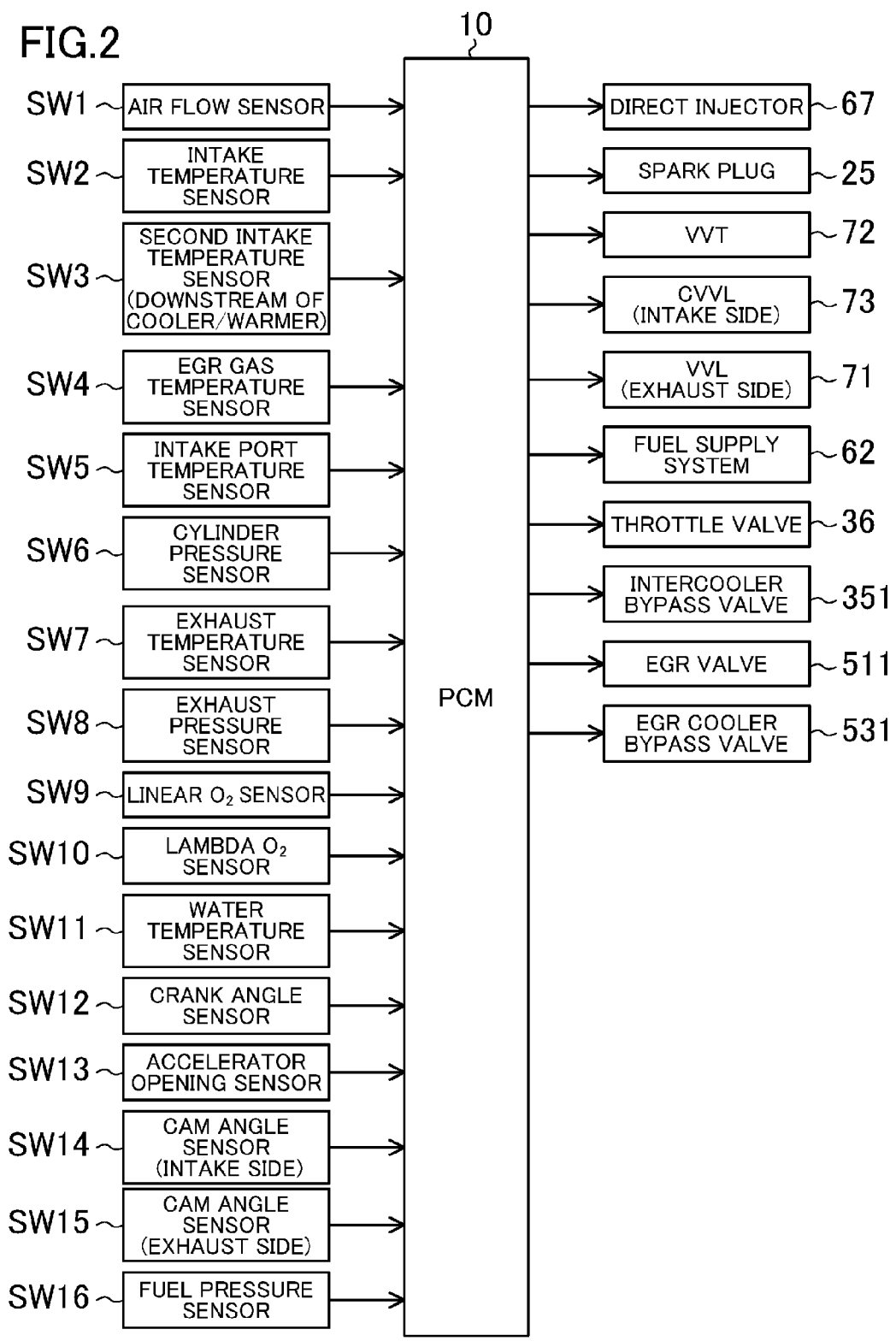
FIG. 2 is a block diagram illustrating the control of the spark-ignition direct-injection engine.
Figure 3:
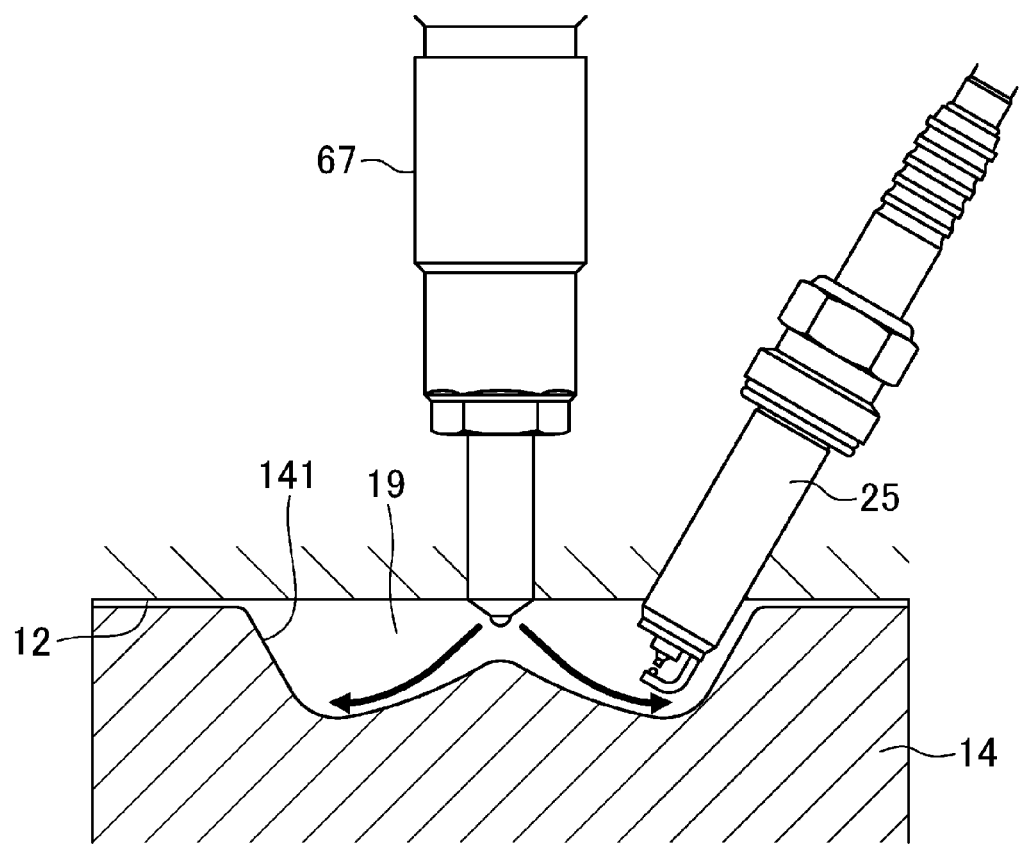
FIG. 3 is an enlarged cross-sectional view of a combustion chamber.

Embodiments of a spark-ignition direct-injection engine will be described hereinafter with reference to the drawings. The following preferred embodiments are mere examples. FIGS. 1 and 2 illustrate the schematic structure of an engine (i.e., an engine body) 1. The engine 1 is a spark ignition gasoline engine mounted in a vehicle and supplied with fuel containing at least gasoline. The engine 1 includes a cylinder block 11 provided with a plurality of cylinders 18 (although only one is shown in FIG. 1, for example, four cylinders are disposed in series), a cylinder head 12 disposed on the cylinder block 11, and an oil pan 13 disposed under the cylinder block 11 and storing lubricant. A piston 14 is reciprocally fitted in each of the cylinders 18. The piston 14 is connected to a crankshaft 15 via a con rod 142. A cavity 141 like a re-entrant cavity of a diesel engine is formed at the top of the piston 14, as shown in FIG. 3 enlarged. The cavity 141 faces an injector 67, which will be described later, when the piston 14 is near the compression top dead center. The cylinder head 12, the cylinder 18, and the piston 14 having the cavity 141 define a combustion chamber 19. The combustion chamber 19 is not limited to the form shown in the figure. The form of the cavity 141, the form of the top of the piston 14, the form of the ceiling of the combustion chamber 19, etc., may be changed as appropriate.

This engine 1 has a relatively high geometrical compression ratio of 15 or higher to improve theoretical thermal efficiency, stabilize compression ignition combustion, which will be described later, etc. The geometrical compression ratio may be set as appropriate within the range from 15 to 20, both inclusive.

The cylinder head 12 has an intake port 16 and an exhaust port 17 for each cylinder 18. The intake port 16 and the exhaust port 17 are provided with an intake valve 21 and an exhaust valve 22, respectively, which open and close the openings at the combustion chamber 19.

Out of valve systems driving the intake valve 21 and the exhaust valve 22, an exhaust valve system has, for example, a hydraulic operation variable mechanism (hereinafter referred to as a variable valve lift (VVL) mechanism) 71, which switches the operating mode of the exhaust valve 22 between a normal mode and a special mode (see FIG. 2). Although its structure is not shown in detail, the VVL 71 includes two types of cams with different cam profiles, a first cam with a single cam lobe, and a second cam with two cam lobes, and a lost motion mechanism selectively transmitting the operating mode of one of the first and second cams to the exhaust valve. When the operating mode of the first cam is transmitted to the exhaust valve 22, the exhaust valve 22 operates in the normal mode to be opened only once in an exhaust stroke. On the other hand, when the operating mode of the second cam is transmitted to the exhaust valve 22, the exhaust valve 22 operates in the special mode to be opened twice in the exhaust stroke and in an intake stroke. The VVL 71 is switched between the normal mode and the special mode in accordance with the operating mode of the engine. Specifically, the special mode is utilized in controlling internal EGR. In the following description, the normal mode operation of the VVL 71, which does not open the exhaust valve 22 twice, may be referred to as "turn off the VVL 71," and the special mode operation of the VVL 71, which opens the exhaust valve 22 twice, may be referred to as "turn on the VVL 71." An electromagnetic drive valve system driving the exhaust valve 22 with an electromagnetic actuator may be employed for the switch between the normal mode and the special mode. The internal EGR may be executed not only by the two-time opening of the exhaust valve 22. The internal EGR may be controlled by, for example, opening the intake valve 21 twice, that is, two-time opening of the intake valve. Alternatively, a negative overlap period of closing both of the intake valve 21 and the exhaust valve 22 may be provided in the exhaust stroke or the intake stroke to retain burnt gas in the cylinder 18 to execute the internal EGR.

Different from the exhaust valve system including the VVL 71, as shown in FIG. 2, the intake valve system includes a phase variable mechanism (hereinafter referred to as a variable valve timing (VVT) mechanism) 72 capable of changing the rotation phase of an intake camshaft relative to the crankshaft 15, and a lift amount variable mechanism (hereinafter referred to as a continuously variable valve lift (CVVL)) 73 capable of continuously changing the lift amount of the intake valve 21. The VVT 72 may have a known hydraulic, electromagnetic, or mechanical structure as appropriate, and the detailed structure is not shown in the figure. The CVVL 73 may have any one of various known structures as appropriate, and the detailed structure thereof is not shown in the figure. The VVT 72 and the CVVL 73 change the opening and closing timing and the lift amount of the intake valve 21.

The cylinder head 12 is provided with the injector 67, which directly injects the fuel into each of the cylinders 18. As shown in FIG. 3 enlarged, the injector 67 is disposed with its nozzle extending from the center of the ceiling of the combustion chamber 19 toward the inside of the combustion chamber 19. The injector 67 directly injects, into the combustion chamber 19, the fuel of the amount corresponding to the operating mode of the engine 1 at the injection timing corresponding to the operating mode of the engine 1. In this example, although not shown in detail, the injector 67 is a multi-hole injector with a plurality of nozzles. This structure allows the injector 67 to inject the fuel to radially spread fuel spray from the center of the combustion chamber 19. As indicated by the arrows of FIG. 3, the fuel spray, which is injected to radially spread from the center of the combustion chamber 19 when the piston 14 is near the compression top dead center, flows along the wall of the cavity 141 formed in the top of the piston. In other words, the cavity 141 is formed to house the fuel spray, which is injected when the piston 14 is near the compression top dead center. This combination of the multi-hole injector 67 and the cavity 141 is advantageous in shortening the mixture formation period after the fuel injection, and shortening a combustion period of the injector 67 is not limited to the multi-hole injector, but may have an outward opening valve.

A fuel tank (not shown) is connected to the injector 67 by a fuel supply passage. The fuel supply passage is provided with a fuel supply system 62 including a fuel pump 63 and a common rail 64, and capable of supplying the fuel to the injector 67 at a relatively high fuel pressure. The fuel pump 63 pumps the fuel from the fuel tank to the common rail 64. The common rail 64 stores the pumped fuel at a relatively high fuel pressure. The valve of the injector 67 is open, thereby injecting the fuel stored in the common rail 64 from the nozzle of the injector 67. Although not shown, the fuel pump 63 is a plunger pump, which is driven by the engine 1. The fuel supply system 62 including the pump, which is driven by the engine, supplies the high fuel pressure fuel of 30 MPa or higher to the injector 67. The fuel pressure may be about 120 MPa at maximum. As will be described later, the pressure of the fuel supplied to the injector 67 changes in accordance with the operating mode of the engine 1. The fuel supply system 62 is not limited to this structure.

As shown in FIG. 3, a spark plug 25 igniting an air-fuel mixture in the combustion chamber 19 is attached to the cylinder head 12. In this example, the spark plug 25 extends obliquely downward from the exhaust-side of the engine 1 and penetrates the cylinder head 12. As shown in FIG. 3, the tip of the spark plug 25 faces the inside of the cavity 141 of the piston 14 located in the compression top dead center.

As shown in FIG. 1, an intake passage 30 is connected to one side surface of the engine 1 to communicate with the intake port 16 of each cylinder 18. On the other hand, an exhaust passage 40, which exhausts the burnt gas (i.e., exhaust gas) from the combustion chamber 19 of each cylinder 18, is connected to the other side surface of the engine 1.

An air cleaner 31 filtering intake air is disposed at the upstream end of the intake passage 30. A surge tank 33 is disposed near the downstream end of the intake passage 30. The intake passage 30 is divided, downstream of the surge tank 33, into independent passages for the respective cylinders 18. The downstream end of each independent passage is connected to the intake port 16 of each cylinder 18.

A water-cooling intercooler/warmer 34 cooling or heating the air, and a throttle valve 36 adjusting the amount of the air taken into each cylinder 18 are disposed in the intake passage 30 between the air cleaner 31 and the surge tank 33. The intake passage 30 is also connected to an intercooler bypass passage 35 bypassing the intercooler/warmer 34. This intercooler bypass passage 35 is provided with an intercooler bypass valve 351 for adjusting the flow rate of the air passing through the passage 35. The opening degree of the intercooler bypass valve 351 is adjusted to adjust the ratio of the flow rate of the intercooler bypass passage 35 to the flow rate of the intercooler/warmer 34, thereby adjusting the temperature of fresh air introduced into the cylinder 18.

The upstream of the exhaust passage 40 is an exhaust manifold including the independent passages divided for the respective cylinders 18 and connected to the outside ends of the exhaust ports 17, and aggregation of the independent passages. A direct catalyst container 41 and an underfoot catalyst container 42 are supplied as exhaust purifiers, which purify harmful components in the exhaust gas, downstream of the exhaust manifold in the exhaust passage 40. Each of the direct catalyst container 41 and the underfoot catalyst container 42 includes a tubular case, and, for example, three-way catalyst in the passage inside the case.

The portion of the intake passage 30 between the surge tank 33 and the throttle valve 36 is connected to the upstream of the direct catalyst container 41 in the exhaust passage 40 via an EGR passage 50 for recirculating part of the exhaust gas in the intake passage 30. This EGR passage 50 includes a main passage 51 provided with an EGR cooler 52 for cooling the exhaust gas with engine cooling water, and an EGR cooler bypass passage 53 for bypassing the EGR cooler 52. The main passage 51 is provided with an EGR valve 511 for adjusting the amount of the exhaust gas to be recirculated to the intake passage 30. The EGR cooler bypass passage 53 is provided with an EGR cooler bypass valve 531 for adjusting the flow rate of the exhaust gas circulating through the EGR cooler bypass passage 53.

The engine 1 configured as above is controlled by a powertrain control module (hereinafter referred to as a PCM) 10. The PCM 10 is a microprocessor including a CPU, a memory, a counter timer group, an interface, and paths connecting these units. The PCM 10 is a controller.

As shown in FIGS. 1 and 2, detection signals of various sensors SW1-SW16 are input to the PCM 10. The various sensors include the following. An air flow sensor SW1 detects the flow rate of the fresh air downstream of the air cleaner 31. An intake temperature sensor SW2 detects the temperature of the fresh air. A second intake temperature sensor SW3 is disposed downstream of the intercooler/warmer 34, and detects the temperature of the fresh air after passing through the intercooler/warmer 34. An EGR gas temperature sensor SW4 is disposed near the portion of the EGR passage 50 connected to the intake passage 30, and detects the temperature of external EGR gas. An intake port temperature sensor SW5 is attached to the intake port 16, and detects the temperature of intake air immediately before flowing into the cylinder 18. A cylinder pressure sensor SW6 is attached to the cylinder head 12, and detects the pressure inside the cylinder 18. An exhaust temperature sensor SW7 and an exhaust pressure sensor SW8 are disposed near the portion of the exhaust passage 40 connected to the EGR passage 50, and detect the temperature and the pressure of the exhaust gas, respectively. A linear $O_2$ sensor SW9 is disposed upstream of the direct catalyst container 41, and detects the concentration of oxygen in the exhaust gas. A lambda $O_2$ sensor SW10 is disposed between the direct catalyst container 41 and the underfoot catalyst container 42, and detects the concentration of oxygen in the exhaust gas. A water temperature sensor SW11 detects the temperature of the engine cooling water. A crank angle sensor SW12 detects the rotation angle of the crankshaft 15. An accelerator opening sensor SW13 detects the opening degree of the accelerator corresponding to the amount of operation of an accelerator pedal (not shown) of the vehicle. Intake-side and exhaust-side cam angle sensors SW14 and SW15 are provided. A fuel pressure sensor SW16 is attached to the common rail 64 of the fuel supply system 62, and detects the pressure of the fuel supplied to the injector 67.

The PCM 10 performs various types of calculation based on these detection signals to determine the states of the engine 1 and the vehicle. In accordance with the determination result, the PCM 10 outputs control signals to the actuators of the injector 67, the spark plug 25, the intake valve-side VVT 72 and CVVL 73, the exhaust valve-side VVL 71, the fuel supply system 62, and the various valves (e.g., the throttle valve 36, the intercooler bypass valve 351, the EGR valve 511, and the EGR cooler bypass valve 531). As such, the PCM 10 operates the engine 1.

Figure 4:
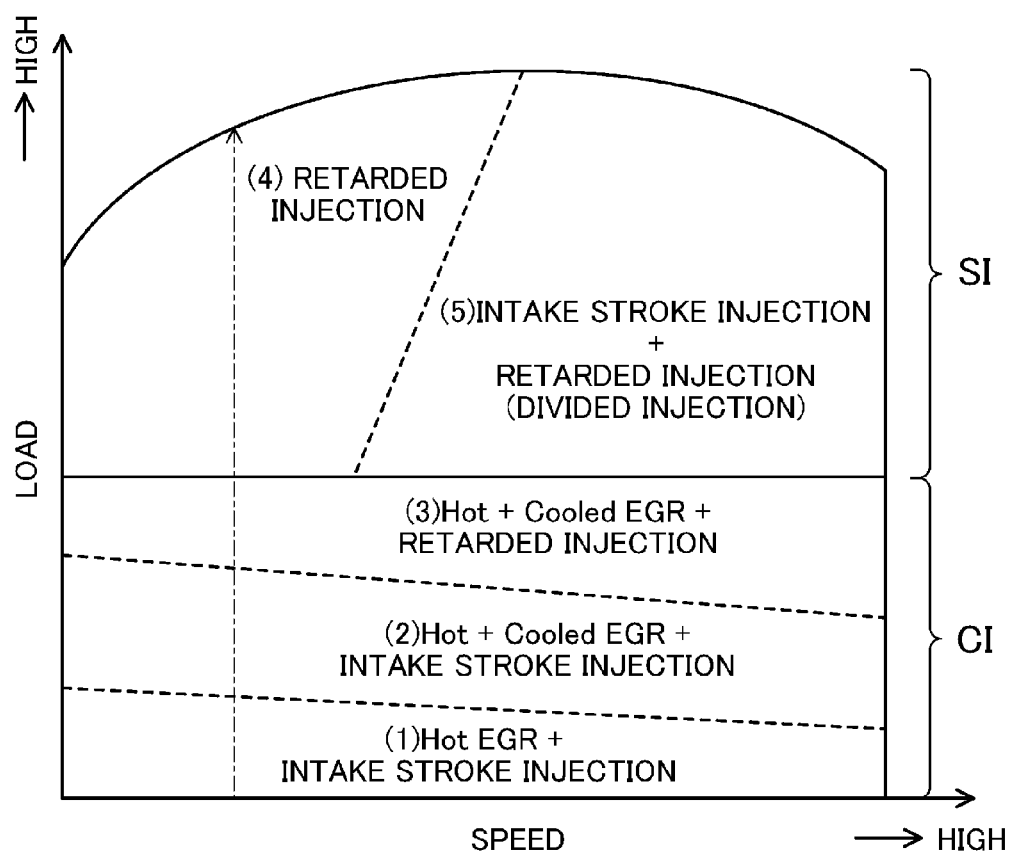
FIG. 4 illustrates the operation range of the engine.

FIG. 4 illustrates an example operation range of the engine 1. This engine 1 aims to improve the fuel efficiency and the exhaust emission. Within a relatively low load range of the engine, ignition with the spark plug 25 is not performed but compression ignition combustion is performed, which burns the fuel by compression auto-ignition. However, with an increase in the engine load 1, the compression ignition combustion becomes rapid to cause problems such as combustion noise. Thus, within a relatively high load range of the engine, this engine 1 stops the compression ignition combustion, and starts the spark ignition combustion with the spark plug 25. As such, the engine 1 is switched between a compression ignition (CI) mode performing the compression ignition combustion, and a spark ignition (SI) mode performing the spark ignition combustion in accordance with the operating mode of the engine 1, particularly in accordance with the load of the engine 1. The boundary between the modes is not limited to what is shown in the figure.

Figure 5A:
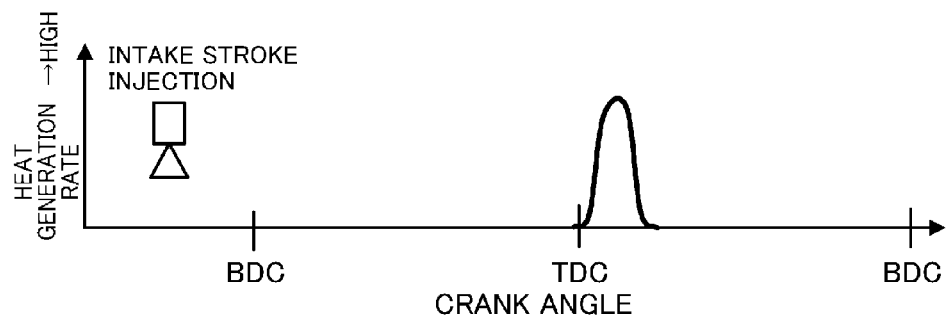
FIG. 5A illustrates an example fuel injection time in performing intake stroke injection in a CI mode, and a heat generation rate in CI combustion according thereto.

The CI mode is divided into three ranges in accordance with the level of the engine load. Specifically, in the lowest load range (1) of the CI mode, hot EGR gas of a relatively high temperature is introduced into the cylinder 18 to improve the ignitionability and the stability in the compression ignition combustion. Although will be described later in detail, the VVL 71 is turned on to perform the two-time opening for exhaust to open the exhaust valve 22 also in the intake stroke. The introduction of the hot EGR gas increases the compression end temperature in the cylinder 18, and is advantageous in improving the ignitionability and the stability in the compression ignition combustion in the low load range (1). As shown in FIG. 5A, in the range (1), the injector 67 injects the fuel into the cylinder 18 at least within the period between the intake stroke and the middle of the compression stroke. Then, a relatively homogeneous lean air-fuel mixture is formed. An excess air ratio $\lambda$ of the air-fuel mixture may be, for example, 2.4 or greater. This reduces generation of RawNOx to improve the exhaust emission performance. As shown in FIG. 5A, the lean air-fuel mixture is subjected to the compression auto-ignition near the compression top dead center.

Although will be described later in detail, in a higher load part of the range (1), specifically, the part including the boundary between the range (1) and the range (2), the fuel is injected into the cylinder 18 at least within the period between the intake stroke and the middle of the compression stroke. The air-fuel mixture has a stoichiometric air-fuel ratio (i.e., $\lambda \approx 1$). The stoichiometric air-fuel ratio enables utilization of a three-way catalyst, and simplifies the control in switching between the SI mode and the CI mode, as will be described later. The stoichiometric air-fuel ratio also contributes to expanding the CI mode to the high load side.

In a range (2) of the CI mode, where the load is higher than in the range (1), the fuel is injected into the cylinder 18 at least in the period between the intake stroke and the middle of the compression stroke (see FIG. 5A) similar to the higher load part of the range (1). This forms an air-fuel mixture with a homogenous stoichiometric air-fuel ratio (i.e., $\lambda \approx 1$).

In the range (2), the temperature inside the cylinder 18 automatically rises with an increase in the engine load. Thus, the engine 1 reduces the amount of the internal EGR to reduce preignition. Although will be described later in detail, the amount of the internal EGR introduced into the cylinder 18 is adjusted. Alternatively, the amount of the hot EGR gas may be adjusted by adjusting the amount of the external EGR having bypassed the EGR cooler 52.

In the range (2), cooled EGR gas of a relatively low temperature is further introduced into the cylinder 18. As such, the hot EGR gas of the high temperature and the cooled EGR gas of the low temperature are introduced to the cylinder 18 at a proper ratio. This optimizes the compression end temperature in the cylinder 18 to secure the ignitionability in the compression ignition and to reduce the rapid combustion. As a result, the compression ignition combustion is stabilized. The EGR ratio, which is the ratio of the EGR gas formed by combining the hot EGR gas and the cooled EGR gas and introduced to the cylinder 18, is set as high as possible where the air-fuel ratio of the mixture is represented by $\lambda \approx 1$. Therefore, in the range (2), the amount of the injected fuel increases with an increase in the engine load, thereby gradually reducing the EGR ratio.

Figure 5B:
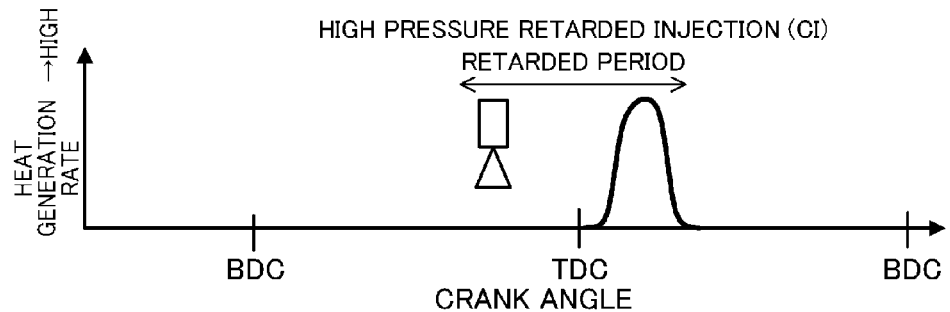
FIG. 5B illustrates an example fuel injection time in performing high pressure retarded injection in the CI mode, and a heat generation rate in the CI combustion according thereto.

In the highest load range (3) of the CI mode including the boundary between the CI mode and the SI mode, the compression end temperature in the cylinder 18 becomes higher. As in the range (1) and the range (2), when the fuel is injected into the cylinder 18 within the period between the intake stroke and the middle of the compression stroke, abnormal combustion such as preignition occurs. On the other hand, if a large amount of the cooled EGR gas of the low temperature is introduced to lower the compression end temperature in the cylinder, the ignitionability in the compression ignition deteriorates. Specifically, the compression ignition combustion is not stably performed simply by controlling the temperature in the cylinder 18. In this range (3), creative fuel injection is used in addition to the control of the temperature in the cylinder 18 to reduce abnormal combustion such as preignition and stabilize the compression ignition combustion. Specifically, in this fuel injection, the fuel is injected into the cylinder 18 at a fuel pressure much higher than the conventional techniques at least within the period between the terminal stage of the compression stroke and the initial stage of the expansion stroke (the period is hereinafter referred to as a "retarded period") as shown in FIG. 5B. This characteristic fuel injection is hereinafter referred to as "high pressure retarded injection" or simply "retarded injection." This high pressure retarded injection reduces abnormal combustion in the range (3) and stabilizes the compression ignition combustion. The details of the high pressure retarded injection will be described later.

In the range (3), similar to the range (2), the hot EGR gas of the high temperature and the cooled EGR gas of the low temperature are introduced to the cylinder 18 at a proper ratio. This optimizes the compression end temperature in the cylinder 18 to stabilize the compression ignition combustion.

While the CI mode is divided into three ranges in accordance with the level of the engine load, the SI mode is divided into two ranges of a range (4) and a range (5) in accordance with the level of the engine speed. In the example figure, where the operation range of the engine 1 is divided into two of low and high speed ranges from, the range (4) is the low speed range, and the range (5) is the high speed range. In the operation range shown in FIG. 4, the boundary between the range (4) and the range (5) is inclined toward the higher speed with the increasing load. However, the boundary between the range (4) and the range (5) is not limited to the example figure.

In each of the range (4) and the range (5), similar to the range (2) and the range (3), the air-fuel mixture has a stoichiometric air-fuel ratio (i.e., $\lambda \approx 1$). The air-fuel ratio of the mixture is constant at the stoichiometric air-fuel ratio (i.e., $\lambda \approx 1$) across the boundary between the CI mode and the SI mode. This enables utilization of a three-way catalyst. In the range (4) and the range (5), although will be described later in detail, the throttle valve 36 is basically fully open, and the opening degree of the EGR valve 511 is adjusted to adjust the amount of the fresh air introduced to the cylinder 18, and the amount of the external EGR gas. The adjustment of the ratio of the gas introduced into the cylinder 18 is advantageous in reducing pump losses. A large amount of the EGR gas is introduced into the cylinder 18 to keep the low combustion temperature of the spark ignition combustion and reduce cooling losses. In the range (4) and the range (5), the external EGR gas, which has been cooled mainly by the EGR cooler 52, is introduced to the cylinder 18. This is advantageous in reducing abnormal combustion, and in reducing generation of Raw NOx. In the full load range, the EGR valve 511 is closed to reduce the external EGR to zero.

As described above, the geometrical compression ratio of the engine 1 is set to 15 or higher (e.g., 18). The high compression ratio increases the compression end temperature and the compression end pressure, and is thus advantageous in stabilizing the compression ignition combustion particularly in the low load range (e.g., the range (1)) of the CI mode. On the other hand, the engine 1 with the high compression ratio is subject to abnormal combustion such as preignition and knocking in the SI mode of the high load.

Figure 5C:
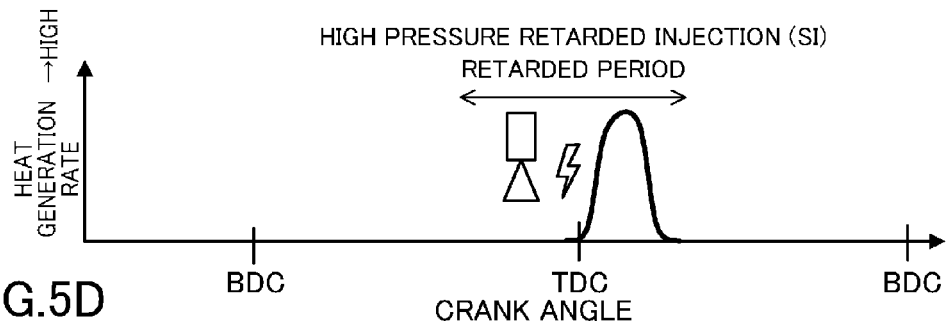
FIG. 5C illustrates an example fuel injection time and an example ignition time in performing the high pressure retarded injection in the SI mode, and a heat generation rate in the SI combustion according thereto.
Figure 5D:
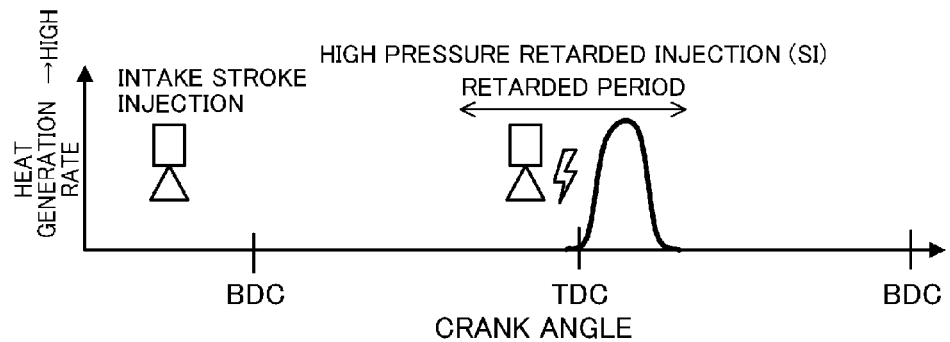
FIG. 5D illustrates an example fuel injection time and an ignition time in performing divided injection of intake stroke injection and the high pressure retarded injection in the SI mode, and a heat generation rate in the SI combustion according thereto.

In the range (4) and the range (5) of the SI mode, the engine 1 performs the above-described high pressure retarded injection to reduce abnormal combustion. More specifically, in the range (4), the engine 1 performs only the high pressure retarded injection which injects the fuel into the cylinder 18 within the retarded period between the terminal stage of the compression stroke and the initial stage of the expansion stroke at the high fuel pressure of 30 MPa or higher, as shown in FIG. 5C. On the other hand, in the range (5), as shown in FIG. 5D, the engine 1 injects part of the fuel into the cylinder 18 within the period of the intake stroke in which the intake valve 21 is open, and injects the rest of the fuel into the cylinder 18 within the retarded period. That is, the divided injection is performed in the range (5). The period of the intake stroke, in which the intake valve 21 is open, is defined not based on the position of the piston, but based on the opening or closing of the intake valve. Thus, the intake stroke herein is the time of closing the intake valve 21 changed by the CVVL 73 and the VVT 72, which may be different from the time when the piston reaches the intake bottom dead center.

Figure 6:
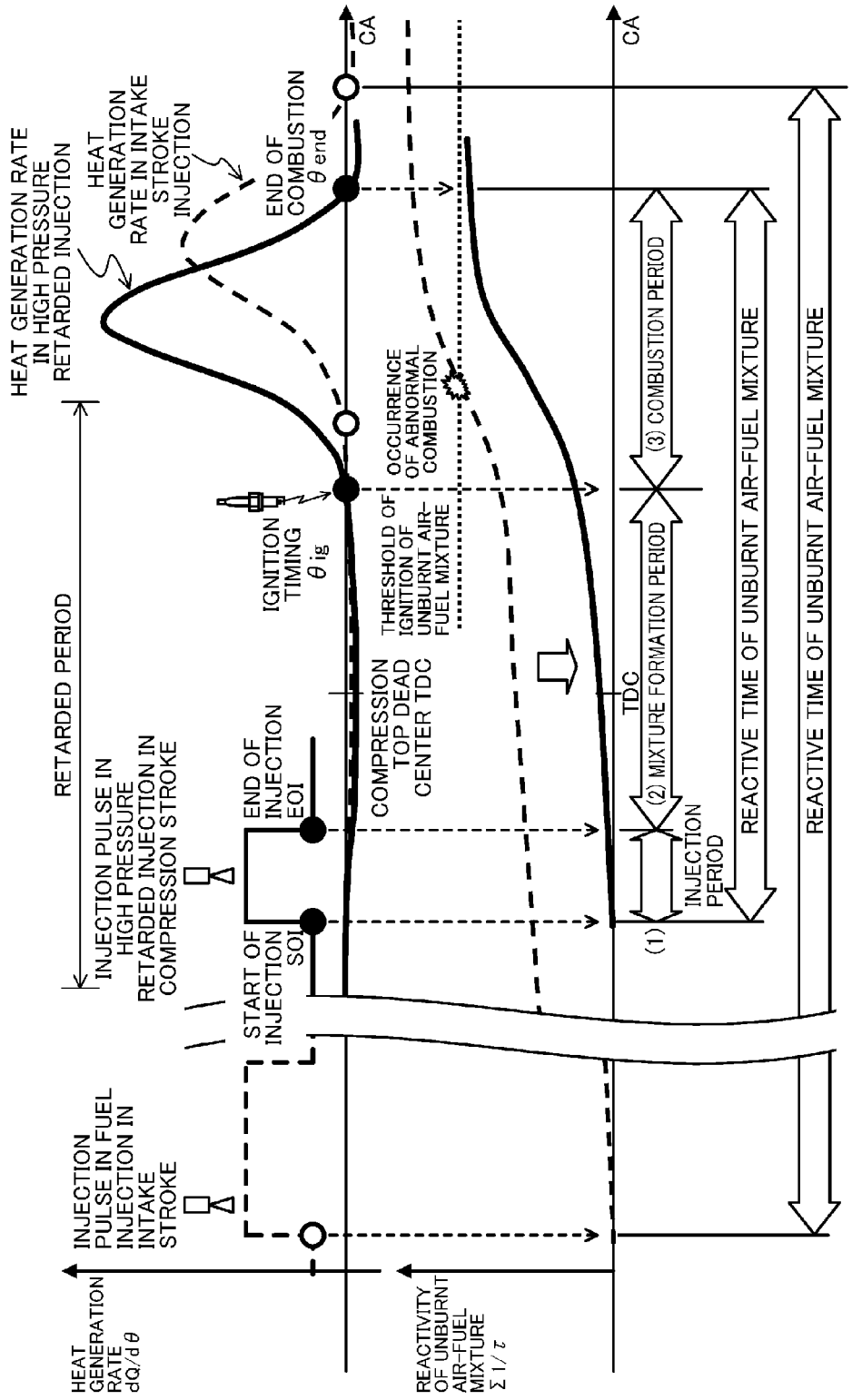
FIG. 6 illustrates comparison between SI combustion in the high pressure retarded injection and conventional SI combustion.

Next, the high pressure retarded injection in the SI mode will be described with reference to FIG. 6. FIG. 6 illustrates the comparison between the above-described SI combustion by the high pressure retarded injection (indicated by the solid line), and the conventional SI combustion injecting the fuel in the intake stroke (indicated by the broken line), in the heat generation rate (the upper portion) and the reactivity of the unburnt air-fuel mixture (the lower portion). In FIG. 6, the horizontal axis represents a crank angle. The comparison is based on the assumption that the operating mode of the engine 1 is in a high-load, low-speed range (i.e., the range (4)), and the same amount of fuel is injected in the SI combustion by the high pressure retarded injection and in the conventional SI combustion.

First, in the conventional SI combustion, a predetermined amount of fuel is injected into the cylinder 18 in the intake stroke (see the broken line of the upper portion in the figure). In the cylinder 18, a relatively homogeneous air-fuel mixture is formed until the piston 14 reaches the compression top dead center after the fuel injection. In this example, the ignition is executed at a predetermined time indicated by a white circle after the compression top dead center, thereby starting the combustion. After the start of the combustion, as indicated by the broken line in the upper portion of FIG. 6, the heat generation rate has its peak and the combustion ends. The period between the start of the fuel injection and the end of the combustion corresponds to the reactive time of the unburnt air-fuel mixture (hereinafter simply referred to as a "reactive time"). As indicated by the broken line in the lower portion of FIG. 6, the reaction of the unburnt air-fuel mixture gradually progresses. The dashed line in the figure indicates the threshold of ignition, which is the reactivity of the unburnt air-fuel mixture to be ignited. Since the conventional SI combustion is performed in the low speed range, and in addition, the reactive time is extremely long the allow the reaction of the unburnt air-fuel mixture to further progress, the reactivity of the unburnt air-fuel mixture exceeds the threshold of ignition before or after the ignition. This causes abnormal combustion such as preignition or knocking.

By contrast, the high pressure retarded injection aims to shorten the reactive time, thereby reducing abnormal combustion. Specifically, as shown in FIG. 6, the reactive time is the sum of the period when the injector 67 injects the fuel (i.e., (1) an injection period), the period until a burnable air-fuel mixture is formed around the spark plug 25 after the end of the injection (i.e., (2) an air-fuel mixture formation period), and the period until the combustion started by the ignition ends (i.e., (3) a combustion period), that is, (1)+(2)+(3). The high pressure retarded injection shortens the injection period, the mixture formation period, and the combustion period of thereby shortening the reactive time. This will be described sequentially.

First, the high fuel pressure relatively increases the amount of the fuel injected from the injector 67 per unit time. Thus, where the amount of the injected fuel is constant, the relation between the fuel pressure and the fuel injection period is roughly as follows. The injection period increases with the decreasing fuel pressure. The injection period decreases with the increasing fuel pressure. Therefore, the high pressure retarded injection, in which the fuel pressure is much higher than that in the conventional injection, shortens the injection period.

The high fuel pressure is advantageous in atomizing the fuel spray injected into the cylinder 18, and increasing the flying distance of the fuel spray. Thus, the relation between the fuel pressure and the fuel evaporation time is roughly as follows. The fuel evaporation time increases with the decreasing fuel pressure. The fuel evaporation time decreases with the increasing fuel pressure. The relation between the fuel pressure and the time until the fuel spray reaches the periphery of the spark plug 25 is roughly as follows. The time to reach increases with the decreasing fuel pressure. The time to reach decreases with the increasing fuel pressure. The mixture formation period is the sum of the fuel evaporation time and the time until the fuel spray reaches the periphery of the spark plug 25. Thus, the mixture formation period decreases with the increasing fuel pressure. The high pressure retarded injection, in which the fuel pressure is much higher than that in the conventional injection, shortens the fuel evaporation time and the time until the fuel spray reaches the periphery of the spark plug 25. As a result, the mixture formation period decreases. By contrast, as indicated by the white circle in the graph, the conventional intake stroke injection under a low fuel pressure requires a much longer mixture formation period. In the SI mode, the combination of the multi-hole injector 67 and the cavity 141 is advantageous in shortening the time until the fuel spray reaches the periphery of the spark plug 25 after the fuel injection. As a result, the mixture formation period is effectively reduced.

Shortening the injection period and the mixture formation period relatively retards the time of the fuel injection, more precisely, the start of the injection. In the high pressure retarded injection, as shown in the upper portion of FIG. 6, the fuel is injected in the retarded period between the terminal stage of the compression stroke and the initial stage of the expansion stroke. The fuel is injected into the cylinder 18 at the high fuel pressure, thereby increasing turbulence in the cylinder to increase the turbulence energy in the cylinder 18. This high turbulence energy is advantageous in shortening the combustion period together with the relatively retarded time of the fuel injection.

Where the fuel is injected in the retarded period of the relation between the fuel pressure and the turbulence energy in the combustion period is roughly as follows. The turbulence energy decreases with the decreasing fuel pressure. The turbulence energy increases with the increasing fuel pressure. Assume that the fuel is injected into the cylinder 18 at a high fuel pressure. Even so, if the injection time is within the intake stroke, the time until the ignition is long, and the inside of the cylinder 18 is compressed in the compression stroke after the intake stroke. This reduces the turbulence in the cylinder 18. As a result, where the fuel is injected in the intake stroke, the turbulence energy in the combustion period is relatively low regardless of the level of the fuel pressure.

The relation between the turbulence energy in the combustion period and the combustion period is roughly as follows. The combustion period increases with the decreasing turbulence energy. The combustion period decreases with the increasing turbulence energy. Thus, the relation between the fuel pressure and the combustion period is as follows. The combustion period increases with the decreasing fuel pressure. The combustion period decreases with the increasing fuel pressure. That is, the high pressure retarded injection shortens the combustion period. By contrast, the conventional intake stroke injection at the low fuel pressure requires the long combustion period of the multi-hole injector 67 is advantageous in improving the turbulence energy in the cylinder 18, and effective in shortening the combustion period of the combination of the multi-hole injector 67 and the cavity 141 allows the cavity 141 to house the fuel spray, thereby effectively shortening the combustion period.

As such, the high pressure retarded injection shortens all of the injection period, the mixture formation period, and the combustion period. As a result, as shown in FIG. 6, the reactive time of the unburnt air-fuel mixture between the start of the fuel injection SOI and the end of the combustion θend is largely shortened as compared to the conventional fuel injection in the intake stroke. A result of shortening the reactive time is shown in the graph in the upper stage of FIG. 6. In the conventional intake stroke injection at the low fuel pressure, as indicated by the white circle, the reactivity of the unburnt air-fuel mixture exceeds the threshold of ignition at the end of the combustion, thereby causing abnormal combustion. As indicated by the black circle, the high pressure retarded injection reduces the reactivity of the unburnt air-fuel mixture at the end of the combustion, thereby reducing the abnormal combustion. In the injection indicated by the white and black circles in the upper graph of FIG. 6, the air-fuel mixture is ignited at the same time.

The combustion period is efficiently shortened by setting the fuel pressure to, for example, 30 MPa or higher. The fuel pressure of 30 MPa or higher effectively shortens both of the injection period and the mixture formation period of the fuel pressure is preferably set as appropriate in accordance with the characteristics of the fuel to be used, which contains at least gasoline. The upper limit may be, for example, 120 MPa.

The high pressure retarded injection employs creative injection of the fuel into the cylinder 18 to reduce abnormal combustion in the SI mode. Different from this injection, retarding the ignition time to reduce abnormal combustion is conventionally known. Retarding the ignition time reduces a rise in the temperature and the pressure of the unburnt air-fuel mixture, thereby reducing the reactivity. However, retarding the ignition time reduces the thermal efficiency and the torque. In performing the high pressure retarded injection, the creative fuel injection reduces abnormal combustion to advance the ignition time. This improves the thermal efficiency and the torque. That is, the high pressure retarded injection not only reduces the abnormal combustion, but also advances the ignition time by the time corresponding to the reduction. This is advantageous in improving the fuel efficiency.

As described above, the high pressure retarded injection in the SI mode shortens all of the injection period, the mixture formation period, and the combustion period of the high pressure retarded injection in the range (3) of the CI mode shortens the injection period, and the mixture formation period. Specifically, the fuel is injected into the cylinder 18 at the high fuel pressure, thereby increasing the turbulence in the cylinder to improve the mixing performance of the atomized fuel. As a result, a relatively homogeneous air-fuel mixture is formed rapidly even if the fuel is injected at a late time near the compression top dead center.

In the high pressure retarded injection in the CI mode, the fuel is injected at a late time near the compression top dead center in the relatively high load range to reduce preignition, for example, in the compression stroke, and to rapidly form the roughly homogenous air-fuel mixture as described above. Thus, reliable compression ignition is possible after the compression top dead center. In the expansion stroke, in which motoring gradually reduces the pressure in the cylinder 18, the compression ignition combustion becomes slowly to reduce a rapid rise (dP/dt) of the pressure in the cylinder 18 according to the compression ignition combustion. This removes NVH constraints, resulting in expansion of the range of the CI mode to the higher load.

Referring back to the description of the SI mode, as described above, in the high pressure retarded injection in the SI mode, the fuel is injected in the retarded period of thereby shortening the reactive time of the unburnt air-fuel mixture. This shortening of the reactive time is effective in a relatively low speed range of the engine 1, since a long actual time is required to change the crank angle. However, it is not so effective in a relatively high speed range of the engine 1, since a short actual time is required to change the crank angle. By contrast, since the fuel injection time is set near the compression top dead center in the retarded injection, in-cylinder gas not containing fuel, in other words, air with a high specific heat ratio is compressed in the compression stroke. As a result, the compression end temperature in the cylinder 18 becomes high in the high speed range. This high compression end temperature causes knocking. Therefore, in performing only the retarded injection in the range (5), the ignition time needs to be retarded to reduce the knocking.

As shown in FIG. 4, in the relatively high speed range (5) of the SI mode, as shown in FIG. 5D, part of the fuel is injected in the cylinder 18 in the intake stroke, and the rest of the fuel is injected in the cylinder 18 in the retarded period. In the intake stroke injection, the specific heat ratio of the in-cylinder gas (i.e., the mixture containing the fuel) in the compression stroke is reduced to maintain the low compression end temperature. The low compression end temperature reduces knocking, thereby advancing the ignition time.

As described above, the high pressure retarded injection increases the turbulence in the cylinder 18 (i.e., the combustion chamber 19) near the compression top dead center, thereby shortening the combustion period. This is also advantageous in reducing knocking to further advance the ignition time. In the range (5), the divided injection of the intake stroke injection and the high pressure retarded injection are performed to reduce abnormal combustion and improve the thermal efficiency.

In the range (5), multi-point ignition may be employed in place of the high pressure retarded injection to shorten the combustion period. Specifically, a plurality of spark plugs are disposed in the combustion chamber to face each other. In the range (5), the intake stroke injection is executed and the plurality of spark plugs are independently driven to perform the multi-point ignition. Since flame propagates from a plurality of flash points in the combustion chamber 19, the flame propagates rapidly to shorten the combustion period. As such, similar to the high pressure retarded injection, the combustion period is shortened, which is advantageous in improving the thermal efficiency. By employing the multi-point ignition, the fuel pressure decreases in the range (5) when no high pressure retarded injection is performed. This reduces the drive force of the fuel pump 63 driven by the engine 1, which is advantageous in improving the fuel efficiency.

FIGS. 7-10 illustrate example control of the parameters of the engine 1 relative to the level of the engine load in the low speed range. The change in the load from the low load to the high load is indicated by the dashed-dotted arrow in the operation map of the engine shown in FIG. 4.

FIGS. 7(a)-7(d) illustrate the state inside the cylinder 18. FIG. 7(a) illustrates the gas composition (i.e., the gas ratio) in the cylinder 18. FIG. 7(b) illustrates the temperature in the cylinder 18 at the start of compression. FIG. 7(c) illustrates the oxygen concentration. FIG. 7(d) illustrates the ratio of external EGR gas to intake gas, which is obtained by subtracting internal EGR gas from the EGR gas introduced to the cylinder 18.

FIGS. 8(a) and 8(d) correspond to FIGS. 7(a) and 7(d), and illustrate the gas composition in the cylinder 18, and the ratio of the external EGR gas to the intake gas, respectively. FIGS. 8(e)-8(g) illustrate the control of the valve system. FIG. 8(e) illustrates the opening and closing times of the exhaust valve 22. FIG. 8(f) illustrates the opening and closing times of the intake valve 21. FIG. 8(g) illustrates the lift amount of the intake valve.

FIGS. 9(a) and 9(d) correspond to FIGS. 7(a) and 7(d). FIGS. 9(h)-9(j) illustrate the control of the intake and exhaust system. FIG. 9(h) illustrates the opening degree of the throttle valve 36. FIG. 9(i) illustrates the opening degree of the EGR valve 511. FIG. 9(j) illustrates the opening degree of the EGR cooler bypass valve 531.

FIG. 10(a) corresponds to FIG. 7(a) and illustrates the gas composition in the cylinder 18. FIGS. 10(k)-10(m) illustrate the control of the fuel injection and the ignition system. FIG. 10(k) illustrates the start of the injection. FIG. 10(l) illustrates the fuel pressure. FIG. 10(m) illustrates the ignition time.

As described above, FIG. 7(a) illustrates the state inside the cylinder 18. The relatively low load range on the left of the figure shows the CI mode. The range on the right of the figure under the higher load shows the SI mode. Although not shown, the amount of the fuel injected into the cylinder 18 (i.e., the total amount of the fuel) increases with the increasing load regardless of the CI mode or the SI mode.

To Predetermined Load T1

In the load range lower than a predetermined load T1 of the CI mode, which corresponds to the range (1) in the operation map of FIG. 4, fresh air and internal EGR gas are introduced to form a lean air-fuel mixture. Specifically, while the throttle valve 36 is fully open as shown in FIG. 9(h), the exhaust VVL 71 is turned on to perform the two-time opening for exhaust, which opens the exhaust valve 22 also the intake stroke, as shown in FIG. 8(e). As shown in FIG. 8(g), the lift amount of the intake valve 21 is the minimum, and then the internal EGR ratio (i.e., the ratio of the amount of the internal EGR gas introduced to the cylinder 18) becomes the highest (see also S1 of FIG. 11). As described above, the lean air-fuel mixture may have an excess air ratio of, for example, about $\lambda \geq 2.4$ in the range (1). Then, the generation of RawNOx is reduced while a large amount of the EGR gas is introduced into the cylinder 18. The introduction of the large amount of the EGR gas into the cylinder 18 is advantageous in reducing pump losses. As shown in FIGS. 10(k) and 10(l), the fuel is injected at a relatively low fuel pressure in the intake stroke in the range (1). The low fuel pressure is advantageous in improving the fuel efficiency. The fuel pressure gradually rises with the increasing engine load.

To the predetermined load T1 (more precisely to a predetermined load T2), the large amount of the internal EGR gas is introduced to the cylinder 18. As shown in FIG. 7(b), this raises the temperature in the cylinder 18, particularly, the compression end temperature. This is advantageous in improving the ignitionability in the compression ignition and the stability in the compression ignition combustion. As shown in FIG. 7(c), the oxygen concentration gradually decreases with the increasing load. Although not shown, in the low or middle load range to a predetermined load T6, in which hot EGR gas is introduced into the cylinder 18, the intercooler bypass valve 351 may be closed to introduce the fresh air warmed by the intercooler/warmer 34 into the cylinder 18.

Between Predetermined Loads T1 and T2

Under the engine load equal to or higher than the predetermined load T1, the air-fuel mixture has a stoichiometric air-fuel ratio (i.e., $\lambda \approx 1$). The amount of the fresh air introduced to the cylinder 18 increases with the increasing amount of the injected fuel, thereby lowering the EGR ratio (see FIG. 7(a)). Between the predetermined loads T1 and T2, the fuel is injected at a relatively low fuel pressure in the intake stroke (see FIGS. 10(k) and 10(l)).

Between the predetermined loads T1 and T2, as shown in FIG. 9(h), the throttle is basically fully open. On the other hand, the lift amount of the intake valve 21 is adjusted as shown in FIG. 8(g), with the exhaust VVL 71 turned on as shown in FIG. 8(e), thereby adjusting the amount of the fresh air and the amount of the internal EGR gas introduced to the cylinder 18.

Figure 11:
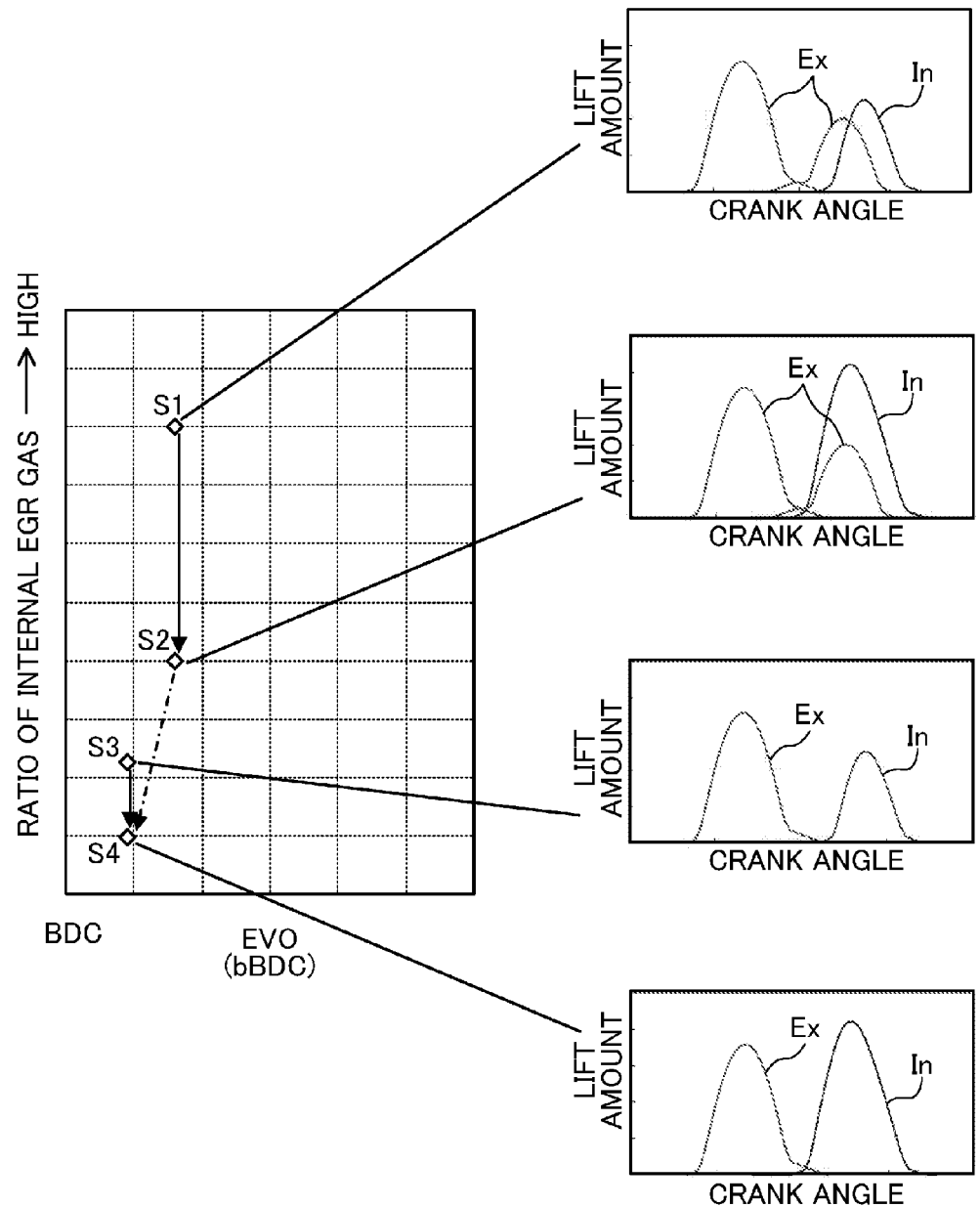
FIG. 11 illustrates the relation between the opening and closing times of the intake and exhaust valves and the internal EGR ratio.

Specifically, as shown in FIG. 11, the lift amount of the intake valve 21 is minimized (see S1 in the figure) while the exhaust VVL 71 is turned on to perform the two-time opening of the exhaust valve, thereby maximizing the internal EGR ratio and minimizing the fresh air introduced to the cylinder 18. This corresponds to the control of the intake and exhaust valves 21 and 22 to the predetermined load T1 as shown in FIG. 8(e), 8(f), and 8(g).

As shown in S2 of FIG. 11, the lift amount of the intake valve 21 is increased while the exhaust valve performs the two-time opening of the exhaust valve, thereby changing the overlap between the opening period of the intake valve 21 and the opening period of the exhaust valve 22 to lower the internal EGR ratio. The closing time of the intake valve 21 is almost fixed even if the lift amount of the intake valve 21 changes. When the lift amount of the intake valve 21 is continuously changed by controlling the CVVL 73 and the VVT 72, the internal EGR ratio continuously decreases. Between the predetermined loads T1 and T2, the lift amount of the intake valve 21 is controlled to maximize the EGR ratio, in other words, to introduce the internal EGR gas as much as possible into the cylinder 18 while maintaining the stoichiometric air-fuel ratio of $\lambda \approx 1$. Specifically, as shown in FIGS. 8(e), 8(f), and 8(g), the lift amount of the intake valve 21 gradually increases, and the opening time of the intake valve 21 (IVO) gradually advances accordingly.

Between Predetermined Loads T2 and T3

The engine load equal to or higher than the predetermined load T2 corresponds to the range (2) in the operation map of FIG. 4, and may increase the temperature in the cylinder 18 to cause preignition. Under the engine load equal to or higher than the predetermined load T2, the amount of the internal EGR gas is reduced, and instead, the cooled external EGR gas is introduced into the cylinder 18. That is, as shown in FIG. 9(i), the opening degree of the EGR valve 511 gradually increases from the closed state to allow the gas to pass through the EGR cooler 52. Then, the amount of the cooled external EGR gas gradually increases with the increasing engine load 1. As shown in FIG. 9(j), the EGR cooler bypass valve 531 remains closed. As such, the amount of the cooled external EGR gas (i.e., the cooled EGR gas) gradually increases with the increasing engine load (see FIG. 7(d) as well).

On the other hand, as shown in FIG. 7(a), the EGR ratio indicating the internal EGR gas and the external EGR gas decreases at a predetermined rate with the increasing load to set the air-fuel ratio of the mixture to the stoichiometric air-fuel ratio (i.e., $\lambda \approx 1$) in the higher range equal to or higher than the predetermined load T2 as well. Thus, in the higher range equal to or higher than the predetermined load T2, the internal EGR gas decreases at a higher decreasing rate with the increasing load (i.e., the slope increases in FIG. 7(a)). Specifically, as shown in FIGS. 8(e), 8(f), and 8(g), the lift amount of the intake valve 21 gradually increases at a higher increasing rate than that in the low load range to the predetermined load T2 with the increasing load. Accordingly, the opening time of the intake valve 21 (IVO) gradually advances.

As such, as shown in FIG. 7(b), the temperature in the cylinder 18 gradually decreases with the increasing load in the higher load range equal to or higher than the predetermined load T2.

Between Predetermined Loads T3 and T4

As described above, the amount of the internal EGR gas to be introduced is adjusted by adjusting the overlap between the opening period of the exhaust valve 22 in the intake stroke, and the opening period of the intake valve 21, basically by controlling the intake CVVL 73. As indicated by the solid arrow in FIG. 11, the amount of the internal EGR gas to be introduced continuously decreases to a predetermined amount (see S1 and S2 in the figure). However, the opening period of the exhaust valve 22 cannot be controlled. Thus, when the amount is to be smaller than the predetermined amount, the exhaust VVL 71 is turned off to stop the two-time opening of the exhaust valve. As indicated by S3 and S4 in the figure, the amount of the internal EGR gas to be introduced discontinuously decreases in accordance with the on-off switching of the exhaust VVL 71 (see the dashed-dotted arrow in FIG. 11)

As such, the internal EGR gas to be introduced to the cylinder 18 cannot continuously decrease. Thus, under the predetermined load T3 of the range (2), the introduction of the internal EGR gas into the cylinder 18 is stopped. Non-cooled external EGR gas bypassed the EGR cooler 52 is introduced as hot EGR gas into the cylinder 18.

That is, as shown in FIG. 8(e), the lift amount of the intake valve 21 is discontinuously largely changed, while the exhaust VVL 71 is turned off to stop the two-time opening of the exhaust valve. Accordingly, the opening time of the intake valve 21 is largely advanced around the intake top dead center. At least in the higher load range of the CI mode equal to or higher than the predetermined load T3, the opening and closing times of the intake valve 21 and the exhaust valve 22 are fixed regardless of the increase in the load.

As shown in FIG. 9(i), the opening degree of the EGR valve 511 is changed to the full-open. As shown in FIG. 9(j), the opening degree of the EGR cooler bypass valve 531 is also changed to the full-open. As shown in FIG. 9(h), the opening degree of the throttle valve 36 is temporarily reduced, thereby increasing the EGR ratio to be higher than 50%. As such, as shown in FIG. 9(d), under the predetermined load T3, a needed amount of the hot EGR gas (i.e., the non-cooled external EGR gas) is introduced into the cylinder 18. In order to reduce the hot EGR gas with the increasing engine load, as shown in FIG. 9(j), the opening degree of the EGR cooler bypass valve 531 is gradually reduced from the full-open in the higher load range equal to or higher than the predetermined load T3. On the other hand, in order to increase the amount of the cooled EGR gas with the increasing engine load, the EGR valve 511 remains open while gradually changing the opening degree of the throttle valve 36 to the full-open.

Between Predetermined Loads T4 and T5

Under the engine load equal to or higher than the predetermined load T4 in the CI mode, it is difficult to obtain the ignitionability in the compression ignition and reduce abnormal combustion such as preignition at the same time simply by adjusting the introduction ratio of the cooled EGR gas and the hot EGR gas. As described above, the high pressure retarded injection is thus performed. This corresponds to the range (3) in the operation map of FIG. 4.

Figure 9:
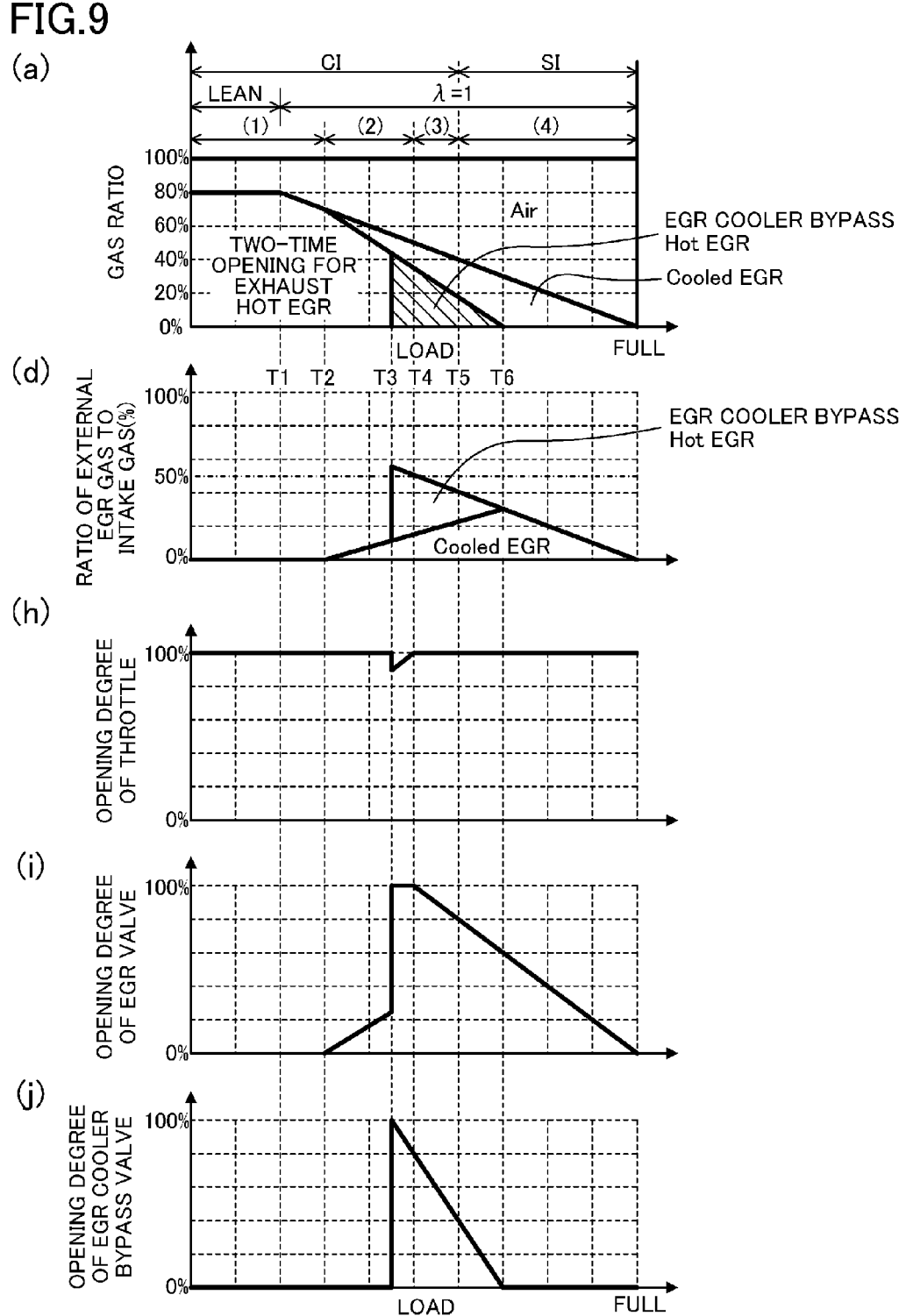
FIG. 9 illustrate changes in (a) the gas composition in the cylinder, (d) the ratio of the external EGR gas to the intake gas (h) the opening degree of a throttle, (i) the opening degree of an EGR valve, and (j) the opening degree of an EGR cooler bypass valve, according to different engine loads.
Figure 10:
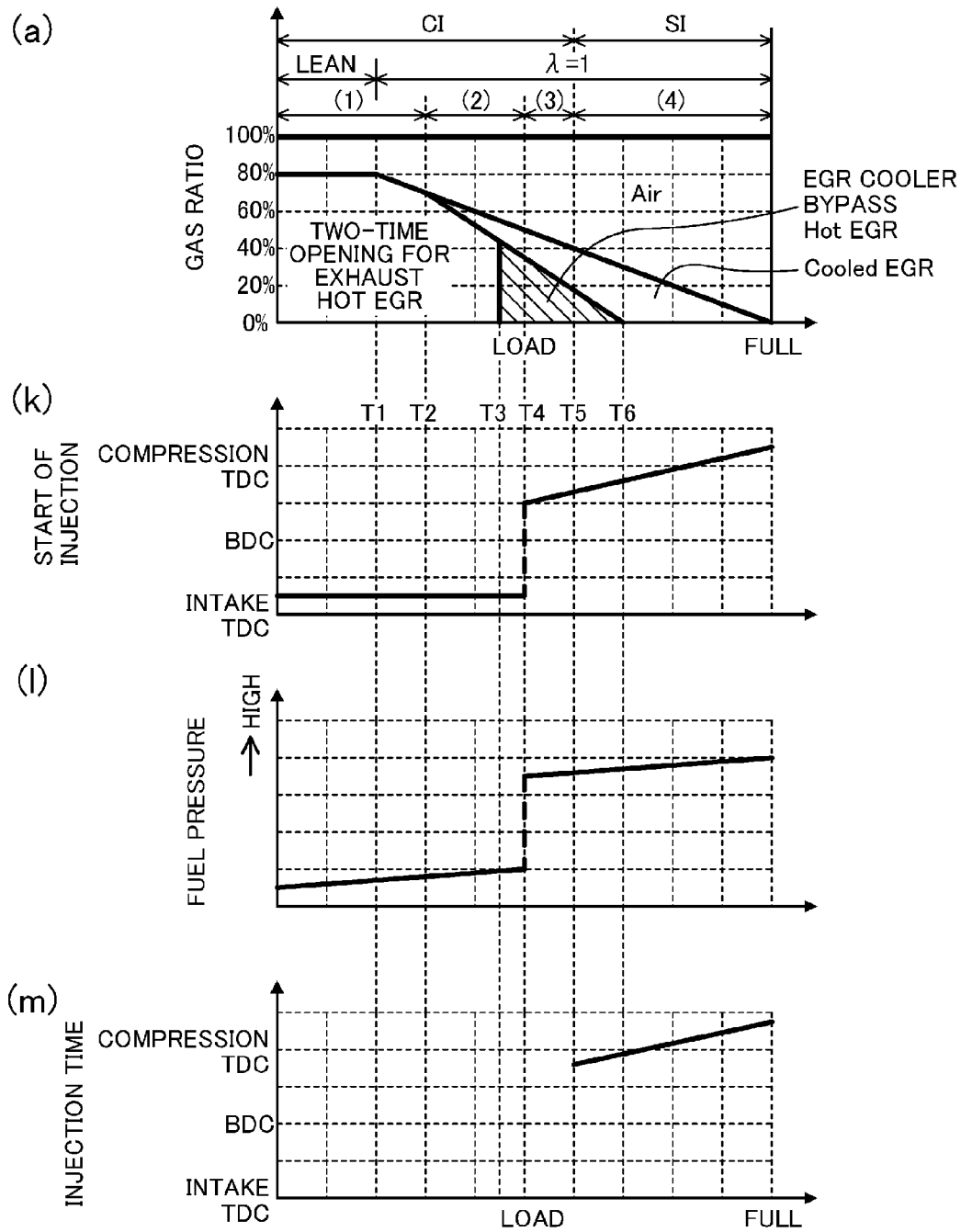
FIG. 10 illustrate changes in (a) the gas composition in the cylinder, (k) the start of the fuel injection (l) the fuel pressure, (m) the ignition time, according to different engine loads.

As shown in FIG. 10(k), the start of the fuel injection is largely changed from the middle of the intake stroke in the ranges (1) and (2) to the time near the compression top dead center. As shown in FIG. 10(*l*), the fuel pressure is also largely changed from a low fuel pressure in the ranges (1) and (2) to a high fuel pressure of 30 MPa or higher. As such, while how to inject the fuel largely are different between the range (2) and the range (3), the gas composition in the cylinder 18 continuously changes. That is, the opening and closing times of the intake valve 21 and the exhaust valve 22, the opening degree of the throttle valve 36, the opening degree of the EGR valve 511, and the opening degree of the EGR cooler bypass valve 531 do not change rapidly (see FIGS. 8(*e*), 8(*f*), and 8(*g*) and FIGS. 9(*h*), 9(*i*), and 9(*j*)). This is advantageous in reducing torque shock, etc., occurring in transition from the range (2) to the range (3), thereby simplifying the control.

In the higher range equal to or higher than the predetermined load T4, as shown in FIG. 10(*k*), the start of the fuel injection as the high pressure retarded injection is gradually retarded with the increasing engine load. As shown in FIG. 10(*l*), the fuel pressure increases with the increasing engine load. With the increasing engine load, preignition, etc., tends to occur, and the pressure rises more rapidly. These problems are effectively reduced by retarding the start of the combustion injection and setting the fuel pressure higher.

Between the predetermined load T4 and the predetermined load T5, the opening degree of the throttle valve 36 is fixed to the full-open (see FIG. 9(*h*)). On the other hand, the opening degree of the EGR valve 511 and the opening degree of the EGR cooler bypass valve 531 decrease with the increasing engine load (see FIG. 9(*i*)(*j*)). As compared to the opening degree of the EGR valve 511, the opening degree of the EGR cooler bypass valve 531 decreases at a decreasing high rate.

Between Predetermined Loads T5 and T6

The predetermined load T5 corresponds to the switching between the CI mode and the SI mode. In the higher load range over the predetermined load T5, the engine operates in the SI mode. In each of the low load range and the high load range, which sandwich the boundary corresponding to the switching between the CI mode and the SI mode, the air-fuel ratio of the mixture is set to the stoichiometric air-fuel ratio ($\lambda \approx 1$). The EGR ratio continuously decreases from the CI mode to the SI mode. This causes no change in the transition from the CI mode to the SI mode, in which the combustion type is switched, except for the start of the spark ignition, and smoothens the switching from the CI mode to the SI mode or vice versa to reduce torque shock, etc. In particular, since the control related to the recirculation of the exhaust gas through the EGR passage 50 has relatively low responsiveness, the control not to rapidly change the EGR ratio is advantageous in improving the controllability.

As described above, the EGR ratio is set as high as possible in the CI mode. Accordingly, in the low load range near the boundary in the SI mode with the CI mode, the EGR ratio becomes high. The high EGR ratio is advantageous in reducing pump loses, but disadvantageous in the combustion stability in the SI mode.

Figure 7:
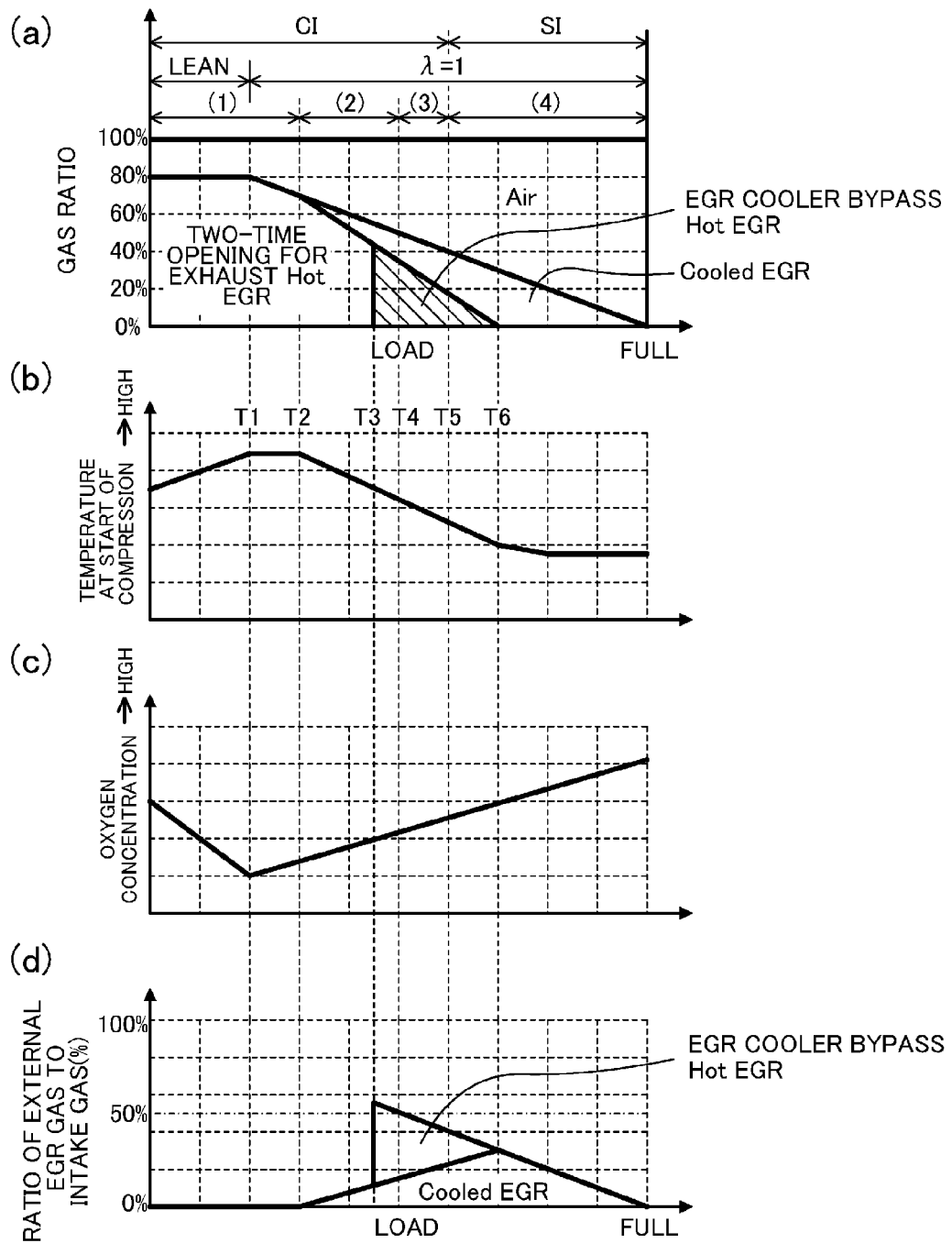
FIG. 7 illustrate changes in (a) the gas composition in a cylinder, (b) the temperature at the start of the compression, (c) the oxygen concentration, and (d) the ratio of external EGR gas to intake gas, according to different engine loads.

In the low load range of the SI mode, specifically, in the lower load range than the predetermined load T6, the hot EGR gas is introduced into the cylinder 18. That is, the non-cooled external EGR gas, which has passed through the EGR cooler bypass passage 53, is introduced into the cylinder 18. As shown in FIG. 7(*b*), the temperature in the cylinder 18 is set relatively high to shorten an ignition delay to increase the stability in the spark ignition combustion at the high EGR ratio.

Specifically, as shown in FIGS. 9(*i*) and 9(*j*), the opening degree of the EGR valve 511 and the opening degree of the EGR cooler bypass valve 531 gradually decrease with the increasing load to be continuous from the CI mode. Then, the amount of the cooled EGR gas increases and the amount of the hot EGR gas decreases with the increasing engine load, while the EGR ratio indicating the cooled EGR gas and the hot EGR gas gradually decreases with the increasing engine load. Accordingly, the amount of the fresh air increases. As a result, under the engine load equal to or higher than the predetermined load T6, the temperature in the cylinder 18 increases to improve the combustion stability, thus the EGR cooler bypass valve 531 is closed to set the amount of the hot EGR gas to zero. At this time, the EGR valve 511 is open. Between the predetermined loads T5 and T6, the opening degree of the throttle valve is maintained at the full-open (see FIG. 9(*h*)). The times of opening and closing the intake valve 21 and the exhaust valve 22 are fixed (see FIGS. 8(*e*), 8(*f*), and 8(*g*)).

On the other hand, as shown in FIG. 10(*k*), the start of the fuel injection is gradually retarded with the increasing engine load. As shown in FIG. 10(*l*), the fuel pressure gradually increases with the increasing engine load. As shown in FIG. 10(*m*), the ignition time is gradually retarded with the increasing engine load at the start of the fuel injection. In the low load range of the SI mode between the predetermined loads T5 and T6, the spark ignition is performed by activating the spark plug 25 at a predetermined ignition time. The combustion is not limited to the type of generating a flame kernel by the spark ignition and allowing flame to propagate, and may be the type of promoting low-temperature oxidation reaction by the spark ignition to cause auto-ignition.

Predetermined Load T6 or Higher

In the higher range of the SI mode equal to or higher than the predetermined load T6, as shown in FIGS. 7(*a*) and 7(*d*), the amount of the hot EGR gas becomes zero, and only the cooled EGR gas is introduced to the cylinder 18. Although not shown, in the higher range equal to or higher than the predetermined load T6, the intercooler bypass valve 351 is open (for example, the opening degree thereof is gradually increased with the increasing engine load), thereby increasing the amount of the fresh air bypassing the intercooler/warmer 34 to lower the temperature of the fresh air to be introduced to the cylinder 18. This is advantageous in reducing abnormal combustion such as preignition and knocking by lowering the temperature in the cylinder 18 in the high load range.

Figure 8:
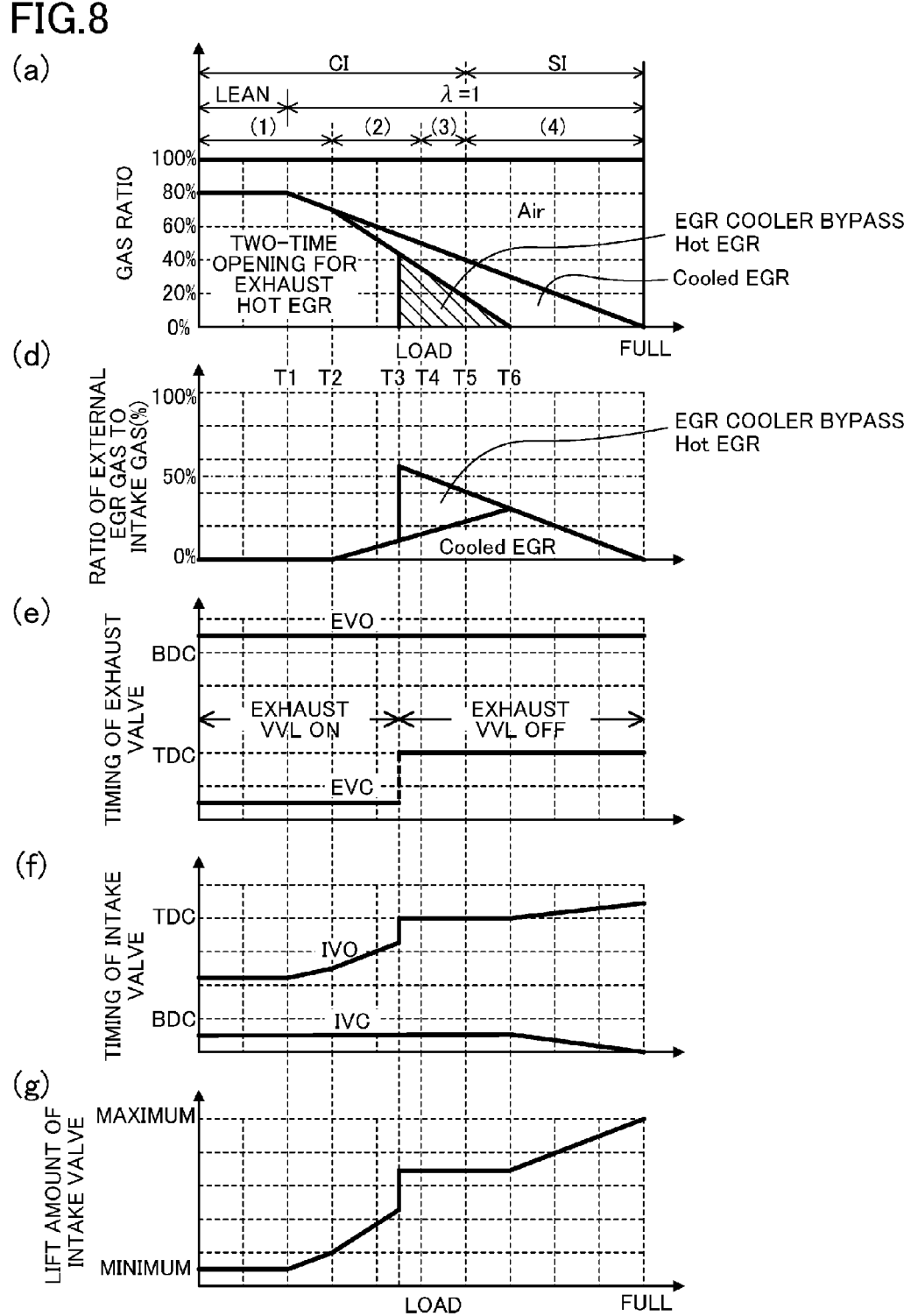
FIG. 8 illustrate changes in (a) the gas composition in the cylinder, (d) the ratio of the external EGR gas to the intake gas, (e) the timing of an exhaust valve, (f) the timing of an intake valve, and (g) the lift amount of the intake valve, according to different engine loads.

As shown in FIG. 9(*h*), the opening degree of the throttle valve 36 is maintained to the full-open, and as shown in FIG. 9(*i*), the EGR valve 511 is gradually closed with the increasing engine load, and completely closed in the full load range. That is, the EGR ratio is zero in the full load range (see FIGS. 7(*a*) and 7(*d*)). On the other hand, as shown in FIGS. 8(*f*) and 8(*g*), the lift amount of the intake valve 21 is gradually increased with the increasing engine load, and is the maximum in the full load range. As such, the amount of the fresh air introduced to the cylinder 18 is increased with the increasing engine load, thereby improving the torque in the high load range of the engine 1.

Furthermore, as shown in FIGS. 10(*k*), 10(*l*), and 10(*m*), the start of the fuel injection is gradually retarded with the increasing engine load, and the fuel pressure is gradually increased with the increasing engine load. Then, the ignition time is gradually retarded with the increasing engine load. Abnormal combustion etc., tends to occur with the increasing engine load, which is effectively reduced by retarding the start of the injection and increasing the fuel pressure.

Figure 12:
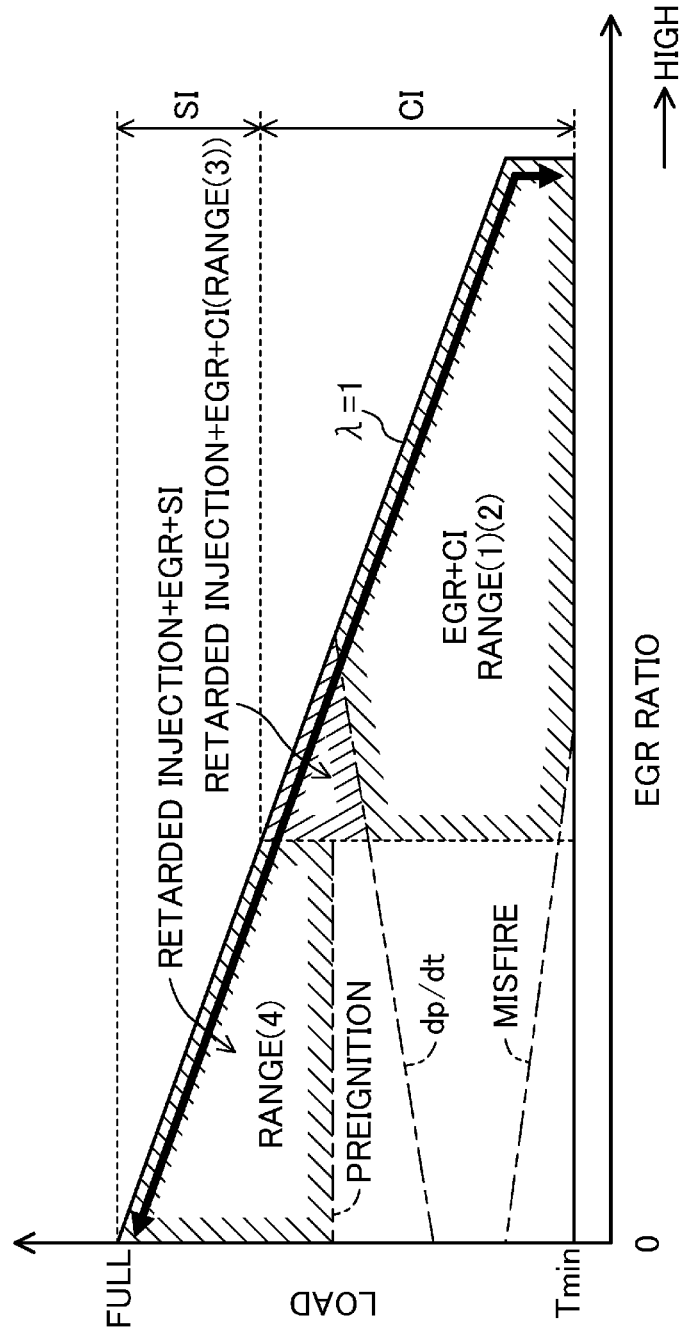
FIG. 12 illustrates the relation between the EGR ratio and the engine load at a predetermined speed.

Changes in the parameters according to the level of the engine load have been described with reference to FIGS. 7-10. FIG. 12 illustrates the relation between the EGR ratio and the engine load. As described above, in the low load range of the engine, the air-fuel ratio is set to lean. On the other hand, in the range where the load is higher than in the low load range, the air-fuel ratio is constant at the stoichiometric air-fuel ratio ($\lambda\approx1$) regardless of the level of the engine load and the difference in the combustion type. The engine 1 is controlled along the control line indicated by the thick solid arrow of FIG. 12. Under the condition where the air-fuel ratio is the stoichiometric air-fuel ratio ($\lambda\approx1$), the EGR ratio is the maximum. The EGR ratio continuously changes in accordance with the level of the engine load but regardless of the switching of the combustion. This is advantageous in improving the controllability when the engine load continuously changes, since the gas composition in the cylinder 18 continuously changes.

In the compression ignition combustion performed by injecting the fuel in the intake stroke while introducing a large amount of the EGR gas into the cylinder 18 (i.e., corresponding to the ranges (1) and (2)), as indicated by the dashed-dotted line in FIG. 12, the engine load equal to or higher than a predetermined value cannot be provided due to the dP/dt constraints. In this embodiment, by performing the high pressure retarded injection injecting the fuel at the high fuel pressure of 30 MPa or higher near the compression top dead center, and introducing a relatively large amount of the EGR gas into the cylinder 18 to make the combustion slow, thereby removing the dP/dt constraints, and stably performing the compression ignition combustion. This corresponds to the combustion in the range (3) of FIG. 4, and expands the CI mode to the high load side. By providing the range (3), the EGR ratio continuously changes in accordance with the level of the engine load.

Since the geometrical compression ratio of the engine 1 is high, in the range of SI combustion causing abnormal combustion such as preignition (see the dashed-dotted line in FIG. 12), the high pressure retarded injection is performed to reduce such abnormal combustion and perform stable spark ignition combustion. The high pressure retarded injection improves the stability in the combustion. Thus, it is advantageous in obtaining predetermined combustion stability, even if a high EGR ratio is set in the load range immediately after the transition from the CI mode to the SI mode. Then, the EGR ratio continuously changes in accordance with the level of the engine load.

As such, the state function inside the cylinder 18 is continuous in accordance with the level of the engine load. This is advantageous in reducing torque shock, etc., in switching the mode in the engine 1 between the SI mode and the CI mode.

In the engine 1 with a high geometrical compression ratio, when the fuel is injected in the high pressure retarded injection, the combustion chamber 19 has a relatively small volume. This is disadvantageous in the air utilization rate in the combustion chamber 19. On the other hand, in the high pressure retarded injection, the fuel is injected into the cavity 141 at the high fuel pressure to strengthen the flow in the cavity 141, thereby increasing the air utilization rate. In particular, since the injector 67 is of the multi-hole type, the turbulence energy of the gas in the cavity 141 effectively increases, which is advantageous in improving the air utilization rate.

As a result, in the range (3) of the CI mode, the relatively homogenous air-fuel mixture is formed quickly, and the ignitionability and the stability in the compression ignition combustion improves. Similarly, the abnormal combustion decreases in the range (4) of the SI mode as well.

As shown in FIG. 10($k$), as compared to the high pressure retarded injection in the SI mode, the start of the fuel injection is advanced in the high pressure retarded injection in the CI mode. In the range (3) of the CI mode, in which the high pressure retarded injection is performed, the compression ignition combustion is performed and the engine 1 is under a relatively low load, thereby introducing a large amount of the EGR gas into the cylinder. This large amount of the EGR gas makes the combustion slow. Thus, the start of the fuel injection is advanced as much as possible as long as abnormal combustion can be reduced to obtain a long formation period of the homogeneous mixture to some extent. This improves the ignitionability and the combustion stability. The time of compression ignition is retarded after the compression top dead center to make the combustion slow with a large amount of the EGR gas, and to reduce the rapid pressure rise.

In the range (4) (or the range (5)) of the SI mode performing the high pressure retarded injection, a large amount of the EGR gas cannot be introduced into the cylinder 18 in view of the combustion stability. Thus, abnormal combustion is preferably reduced by retarding the start of the fuel injection and using the effects and the advantages of the retarded injection.

Other Configurations for Controlling Hot EGR Gas

As described above, when the amount of the internal EGR gas is to be controlled by the combination of control of the exhaust VVL 71 and the intake CVVL 73, the EGR ratio becomes discontinuous at a predetermined amount (see FIG. 11). An engine 100 shown in FIGS. 13-18 utilizes dynamic pressure exhaust to continuously change the amount of the internal EGR gas from the maximum to zero.

Specifically, the engine 100 has a particular exhaust structure. FIGS. 14-17 illustrate the structure of an exhaust manifold 400 in detail. As shown in FIGS. 14-17, the exhaust manifold 400 includes three independent exhaust passages 401, 402, and 403 having upstream ends connected to exhaust ports 17 of first to fourth cylinders 18A-18D. The exhaust manifold 400 further includes a gathering portion 404 collecting the downstream ends (the ends apart from the engine body 100) of the independent exhaust passages 401, 402, and 403 to come close to each other while being independent from each other. The exhaust manifold 400 further includes a negative pressure generator 405 provided downstream of the gathering portion 404, and having inside, a common space communicating with all of the independent exhaust passages 401, 402, and 403. A single exhaust pipe 40 is connected to the downstream of the negative pressure generator 405. For convenience, the independent exhaust passages 401, 402, and 403, etc., are indicated by imaginary lines in FIG. 16, and bypass passages 411, 412, and 413 and a bypass downstream 414 are not shown in FIG. 15, which will be described later.

As such, in this engine 100, the three independent exhaust passages 401, 402, and 403 are prepared for the four cylinders 18A, 18B, 18C, and 18D. This is because the independent exhaust passage 402 is divided in the center to form a Y-shape to be shared by the second cylinder 18B and the third cylinder 18C. Specifically, the independent exhaust passage 402 includes branch passage portions 4021 and 4022 extending from the exhaust ports 17 of the second cylinder 18B and the third cylinder 18C, respectively, and merging downstream, and a single common passage portion 4023 extending downward from the merging portion of the branch passage portions 4021 and 4022. On the other hand, the independent exhaust passages 401 and 403 connected to the exhaust ports 17 of the first cylinder 18A and the four cylinder 18D are formed like non-branched single pipes. The independent exhaust passages 401 and 403 like the single pipes may be hereinafter referred to as a "first independent exhaust passage 401" and a "third independent exhaust passage 403," respectively, and the independent exhaust passage 402 branched into two may be hereinafter referred to as a "second independent exhaust passage 402."

In the 4-cycle, 4-cylinder engine 100, the fuel is ignited in the order of the first cylinder 18A, the third cylinder 18C, the four cylinder 18D, and the second cylinder 18B. In the second cylinder 18B and the third cylinder 18C connected to the upstream ends of the second independent exhaust passage 402, which are branched into two, the order of the exhaust (the order of performing the exhaust strokes) are not continuous. Thus, even when the common independent exhaust passage 402 is connected to the second cylinder 18B and the third cylinder 18C, the exhaust gas from the both cylinders 18B and 18C do not flow into the independent exhaust passage 402 at the same time.

The first and third independent exhaust passages 401 and 403 formed like the single pipes extend toward the center of the cylinder bank such that the downstream ends coincide with the downstream ends of the second independent exhaust passage 402. That is, as shown particularly in FIG. 15, the downstream end of the first independent exhaust passage 401, the downstream end of the common passage portion 4023 of the second independent exhaust passage 402, and the downstream end of the third independent exhaust passage 403 are bundled at one portion of the downstream apart from the center of the exhaust-sidewall of the engine body 1 (i.e., in the position between the second cylinder 18B and the third cylinder 18C as viewed from above). The downstream ends of the three bundled independent exhaust passages 401, 402, and 403, and a holding member, etc., bundling the passages form the gathering portion 404.

Figure 17:
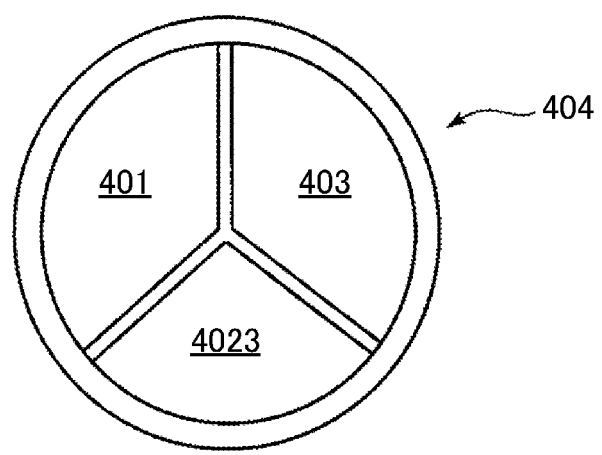
FIG. 17 is a cross-sectional view taken along the line A-A of FIG. 15.

As shown in FIG. 17, the downstream ends of the independent exhaust passages 401, 402, and 403, that is, the downstream end of the first independent exhaust passage 401, the downstream end of the common passage portion 4023 of the second independent exhaust passage 402, and the downstream end of the third independent exhaust passage 403 have sector cross-sections, which are formed by evenly dividing a circle into three. The three downstream ends having such cross-sections gather to form the gathering portion 404, which is almost the circle as a whole.

Figure 14:
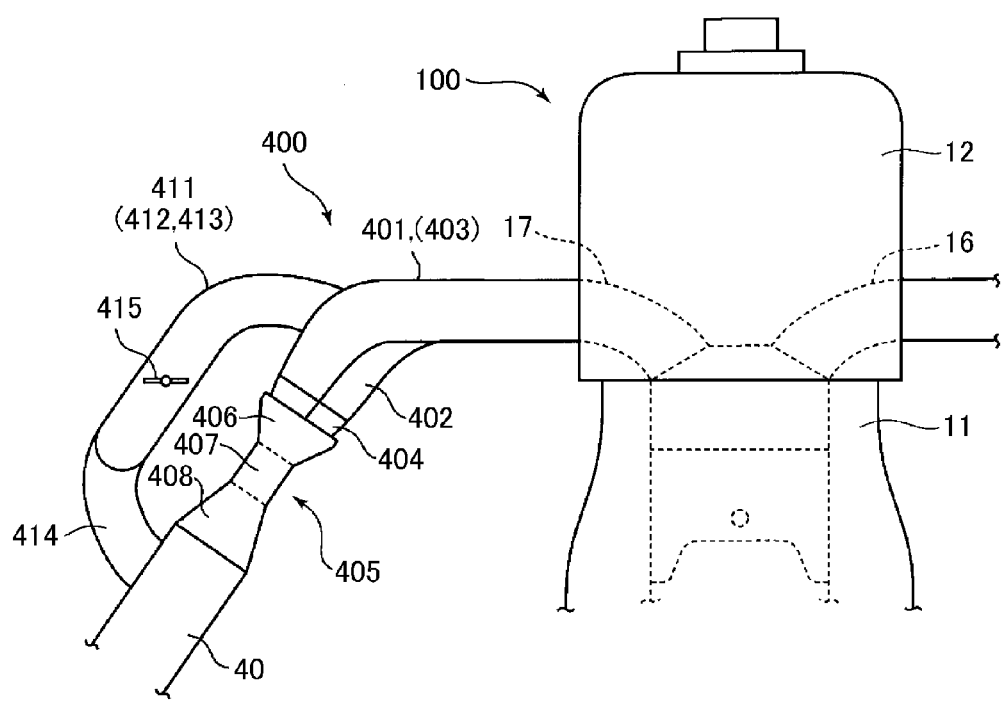
FIG. 14 is a side view illustrating the structure of an exhaust manifold in the spark-ignition direct-injection engine shown in FIG. 13.
Figure 15:
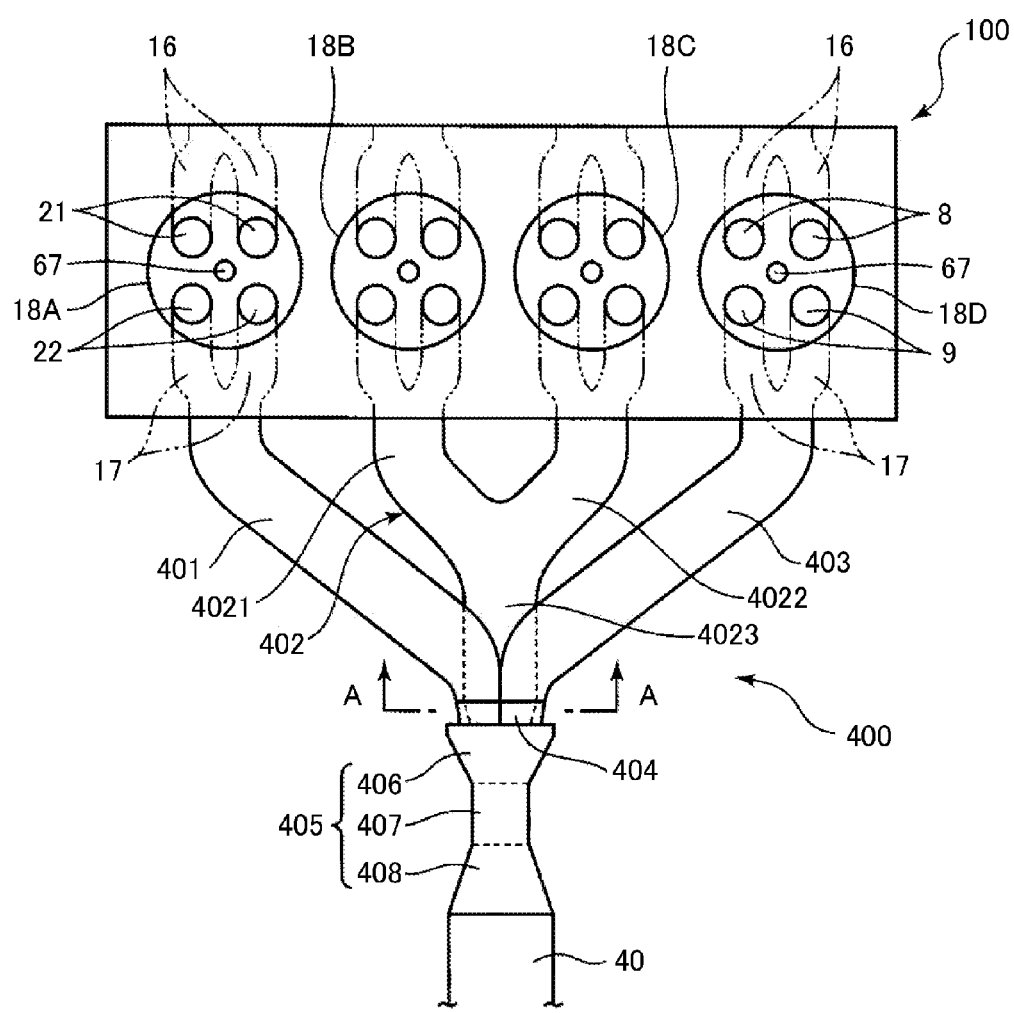
FIG. 15 is a side view illustrating the structure of an independent exhaust passage included in the exhaust manifold of the spark-ignition direct-injection engine shown in FIG. 13.

The downstream ends of the independent exhaust passages 401, 402, and 403, which are adjacent to each other at the gathering portion 404, are formed like nozzles having passage cross-sectional areas, which decrease toward the downstream (for example, see FIGS. 14 and 15). Thus, the exhaust gas, which has passed through the downstream ends of the independent exhaust passages 401, 402, and 403, is sprayed out to the negative pressure generator 405 after the speed (i.e., the flow rate) has increased at the downstream ends.

At the gathering portion 404, the downstream ends of the independent exhaust passages 401, 402, and 403 are bundled at an angle relatively close to parallel. Specifically, the downstream ends of the independent exhaust passages 401, 402, and 403 are disposed such that the axial centers form a narrow angle around, for example, 10 degrees.

As shown in FIGS. 14 and 15, the negative pressure generator 405 includes a nozzle portion 406 with a passage cross-sectional area gradually decreasing toward the downstream, a straight portion 407 with an almost uniform passage cross-sectional area, and a diffuser portion 408 with a passage cross-sectional area gradually increasing toward the downstream, in this order from the upstream. Thus, the exhaust gas sprayed out of any of the downstream ends of the independent exhaust passages 401, 402, and 403, flows into the nozzle portion 406 first, and is then accelerated (at this time, the pressure of the exhaust gas decreases). The exhaust gas, which has been accelerated at the nozzle portion 406, is decelerated while passing through the straight portion 407 and the diffuser portion 408. Accordingly, the pressure of the exhaust gas is recovered.

When the exhaust gas is sprayed out at a high speed from any of the downstream ends of the independent exhaust passages 401, 402, and 403 toward the nozzle portion 406 of the negative pressure generator 405, a negative pressure portion with a relatively low pressure is generated around the sprayed out gas. When the exhaust gas is sprayed out from the independent exhaust passage of any of the cylinders (i.e., any of 401, 402, or 403) into the negative pressure generator 405, the negative pressure affects the independent exhaust passages of other cylinders, etc., thereby sucking out the exhaust gas toward the downstream. It is known as an "ejector effect."

It is known that a sufficient ejector effect is obtained where an equivalent circle diameter D of the area of the downstream end of the nozzle portion 406 (which is equal to the area of the straight portion 407), and an equivalent circle diameter a of the downstream ends of the independent exhaust passages 401, 402, and 403 satisfies a/D≥0.5. Thus, in this embodiment, a/D is set to 0.5 or higher (e.g., 0.65). The equivalent circle diameters here are diameters where the cross-section of each shape is replaced with a perfect circle with the same area.

Figure 16:
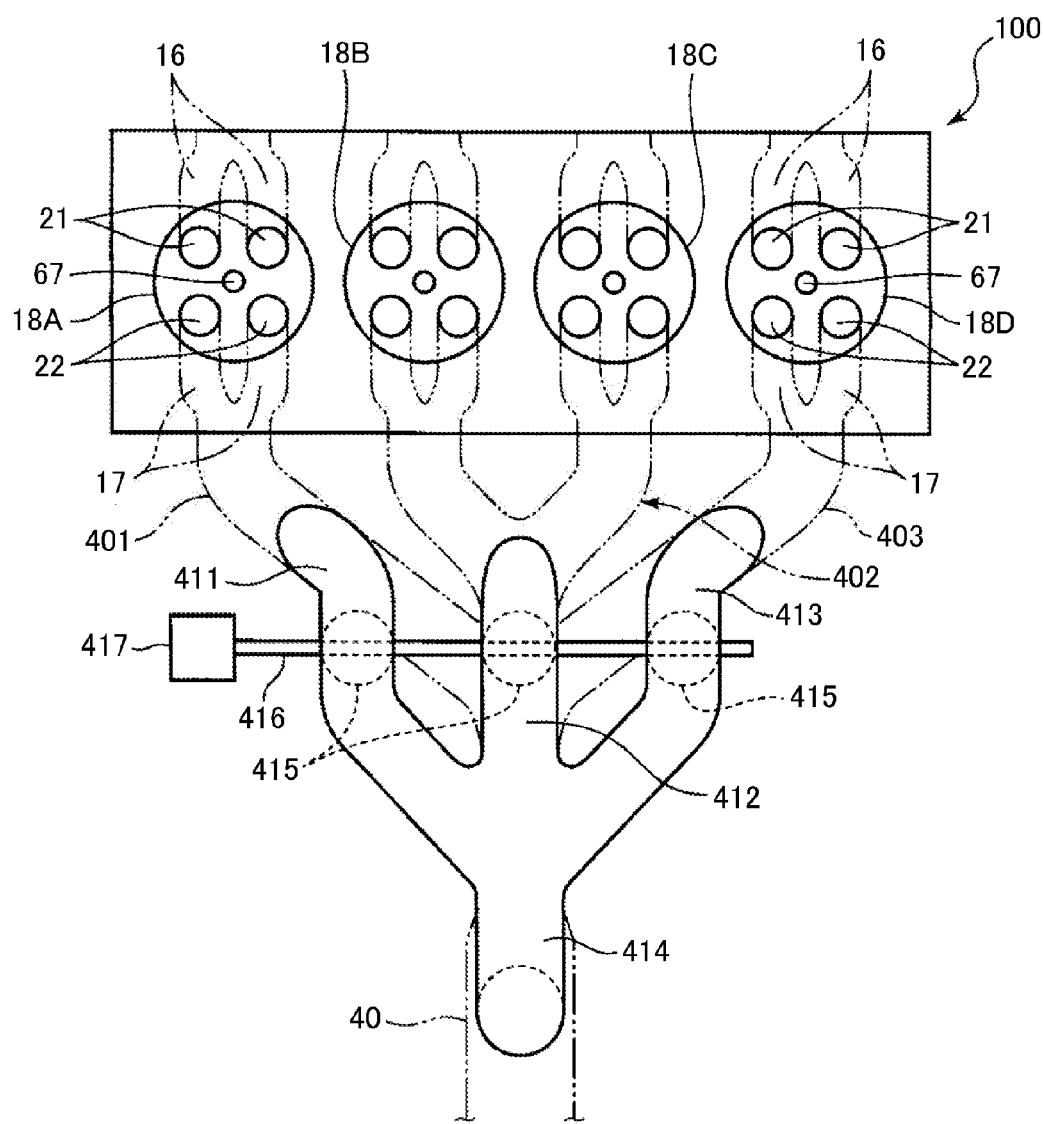
FIG. 16 is a side view illustrating the structure of a bypass passage included in the exhaust manifold of the spark-ignition direct-injection engine shown in FIG. 13.

As shown in FIGS. 14 and 16, this exhaust manifold 400 includes the independent exhaust passages 401, 402, and 403, the negative pressure generator 405, etc. In addition, the exhaust manifold 400 includes the three bypass passages 411, 412, and 413, which are branched from the middle portions of the independent exhaust passages 401, 402, and 403, respectively, extend and merge in the downstream, and the bypass downstream 414, which extends downstream from the merging portion of the bypass passages 411, 412, and 413. The bypass downstream 414 is connected to the exhaust pipe 40, which is an exhaust passage having a downstream end located downstream of the negative pressure generator 405. Specifically, the bypass passages 411, 412, and 413 connect the middle portions of the independent exhaust passages 401, 402, and 403 (i.e., the upstream of the negative pressure generator 405) to the exhaust pipe 40 via the bypass downstream 414. The bypass passages 411, 412, and 413 merge at a relatively wide angle. For example, the axial centers of the bypass passages 411 and 412, as well as the axial centers of the bypass passages 412 and 413 intersect each other at an angle of 30 degrees or wider.

Each of the bypass passages 411, 412, and 413 and the bypass downstream 414 has an almost uniform cross-sectional area from the upstream end to the downstream end. The cross-sectional area is greater than the cross-sectional area of each of the independent exhaust passages 401, 402, and 403 in the downstream. In this embodiment, the cross-sectional areas of the bypass passages 411, 412, and 413, and the bypass downstream 414 are almost equal to the circular cross-sectional area of the gathering portion 404 of the downstream ends of the independent exhaust passages 401, 402, and 403 (the total area of the downstream ends of the passage 401, 402, and 403).

A passage switching valve 415, which can be opened and closed, is provided inside each of the bypass passages 411, 412, and 413. The passage switching valves 415 rotate around a common rod 416. One end of the rod 416 is connected to an actuator 417. When the actuator 417 operates to rotate the rod 416, the passage switching valves 415 are accordingly driven at the same time to open and close the bypass passages 411, 412, and 413.

The passage switching valves 415 operate as described above are used to allow or not to allow the exhaust gas from the cylinders 18A-18D to pass to the negative pressure generator 405. For example, when the passage switching valves 415 are completely closed, all the exhaust gas from the cylinders 18A-18D pass through the independent exhaust passages 401, 402, and 403 and flow into the negative pressure generator 405. This generates a strong negative pressure (i.e., sufficiently lowered negative pressure) inside the negative pressure generator 405, thereby obtaining a sufficient suck-out effect (i.e., the ejector effect) of the exhaust gas. On the other hand, when the passage switching valves 415 are fully open, most of the exhaust gas from the cylinders 18A-18D pass through the bypass passages 411, 412, and 413 and flow downstream into the exhaust pipe 40 in the downstream of the negative pressure generator 405 without passing through the negative pressure generator 405. Then, since the negative pressure generator 405 does not generate any negative pressure, the ejector effect largely decreases. When the passage switching valves 415 are fully open, most of the exhaust gas passes through the bypass passages 411, 412, and 413 (not the independent exhaust passages 401, 402, and 403), since the cross-sectional areas of the bypass passages 411, 412, and 413 are larger than the cross-sectional areas of the downstream ends of the independent exhaust passages 401, 402, and 403 and the flow resistance is low.

Figure 13:
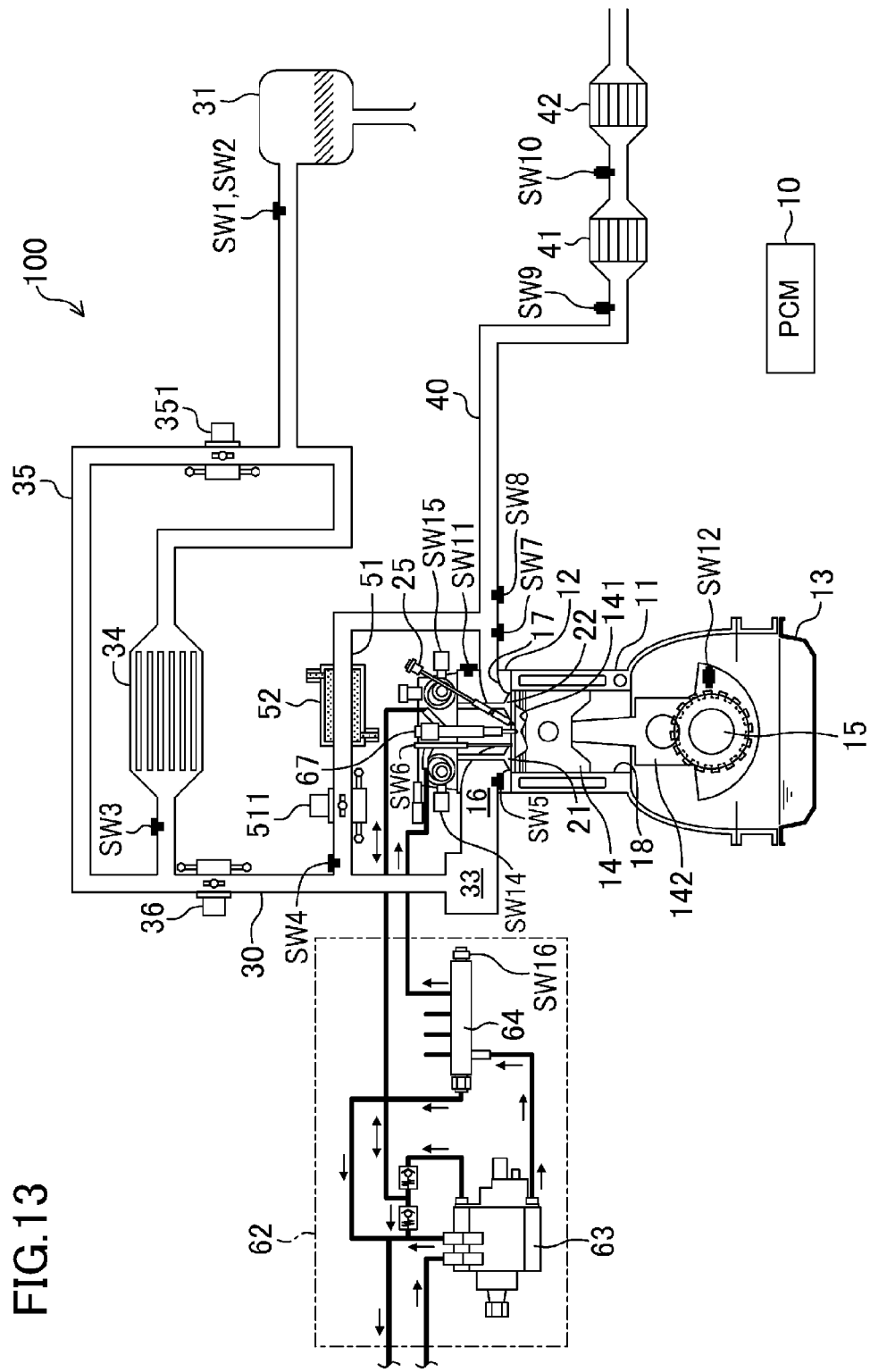
FIG. 13 is a schematic view illustrating the structure of a spark-ignition direct-injection engine, which is different from the structure of FIG. 1.
Figure 18:
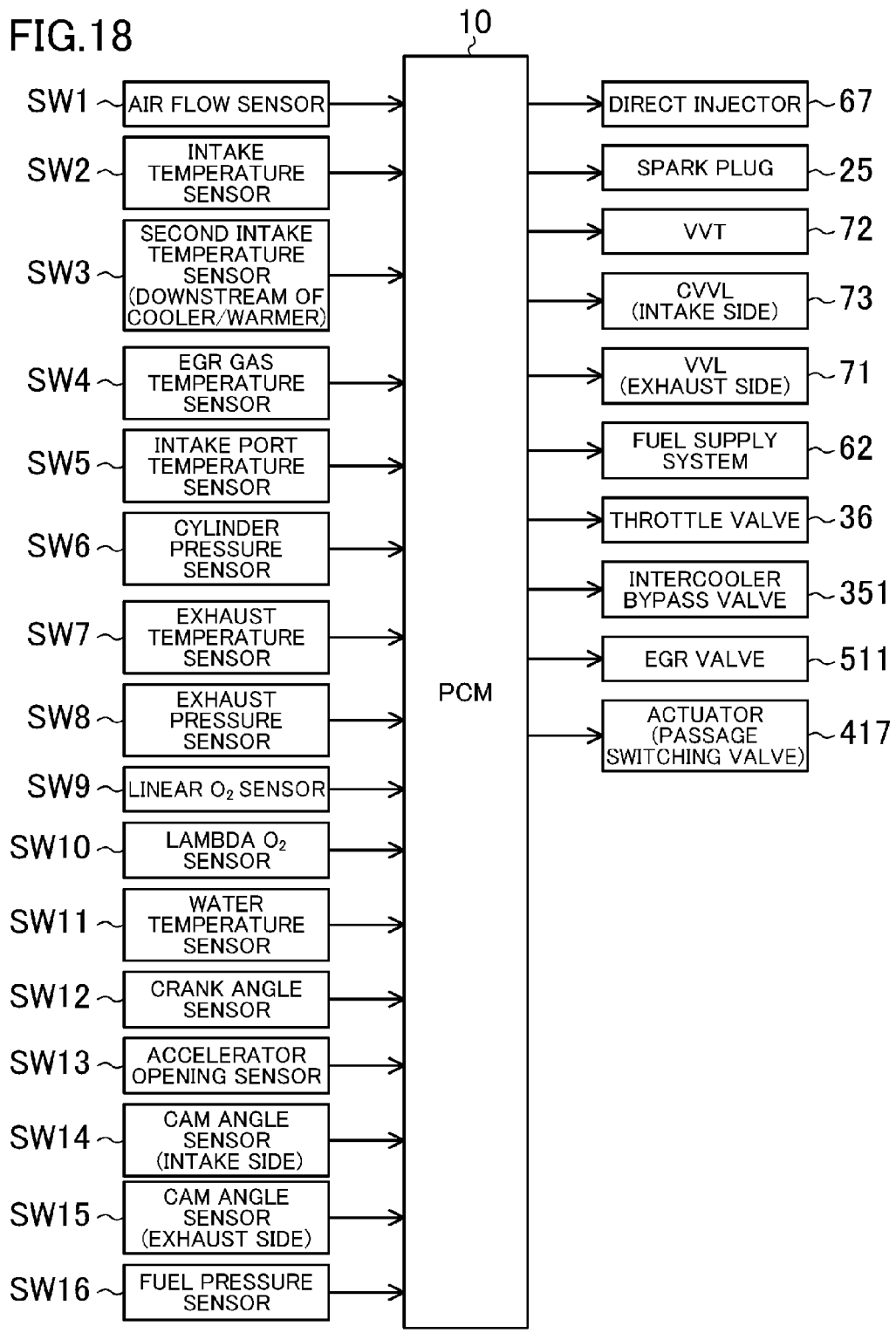
FIG. 18 is a block diagram illustrating the control of the spark-ignition direct-injection engine shown in FIG. 13.

As such, the exhaust system of the engine 100 includes the negative pressure generator 405, etc., thereby continuously changing the internal EGR ratio to zero, although will be described later in detail. Thus, this engine 100 does not require external EGR gas, which bypasses the EGR cooler 52 as hot EGR gas. As shown in FIG. 13, the EGR cooler bypass passage 53 and the EGR cooler bypass valve 531 are not provided, and only a main passage 51 is provided as an EGR passage. As shown in FIG. 18, a PCM 10 outputs a control signal to the actuator 417 adjusting the opening degree of the passage switching valve 315, instead of outputting a control signal to the EGR cooler bypass valve 531.

Figure 19:
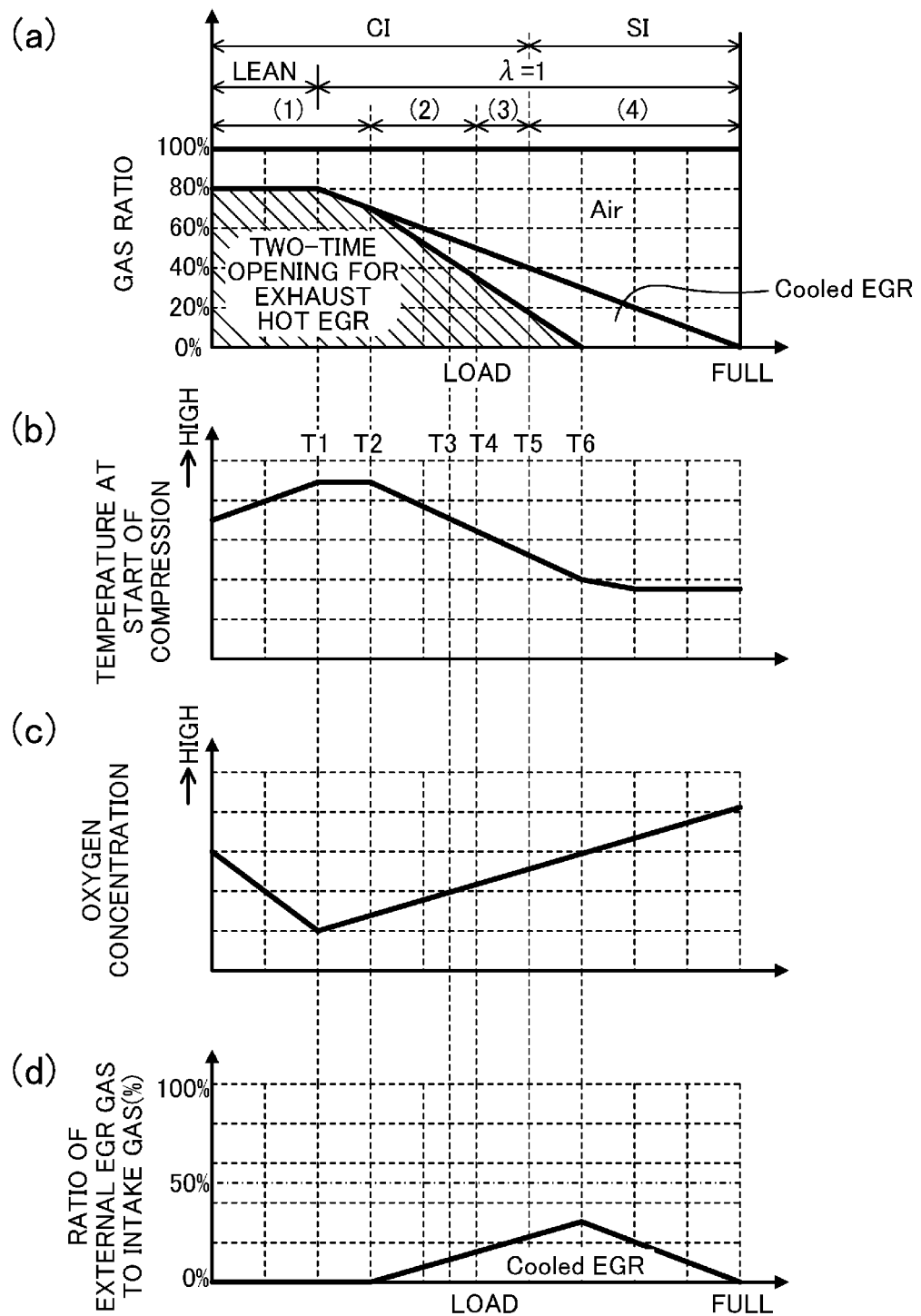
FIG. 19 illustrate changes in (a) the gas composition in a cylinder, (b) the temperature at the start of the compression, (c) the oxygen concentration, (d) the ratio of external EGR gas to intake gas, according to different engine loads in the spark-ignition direct-injection engine shown in FIG. 13.
Figure 20:
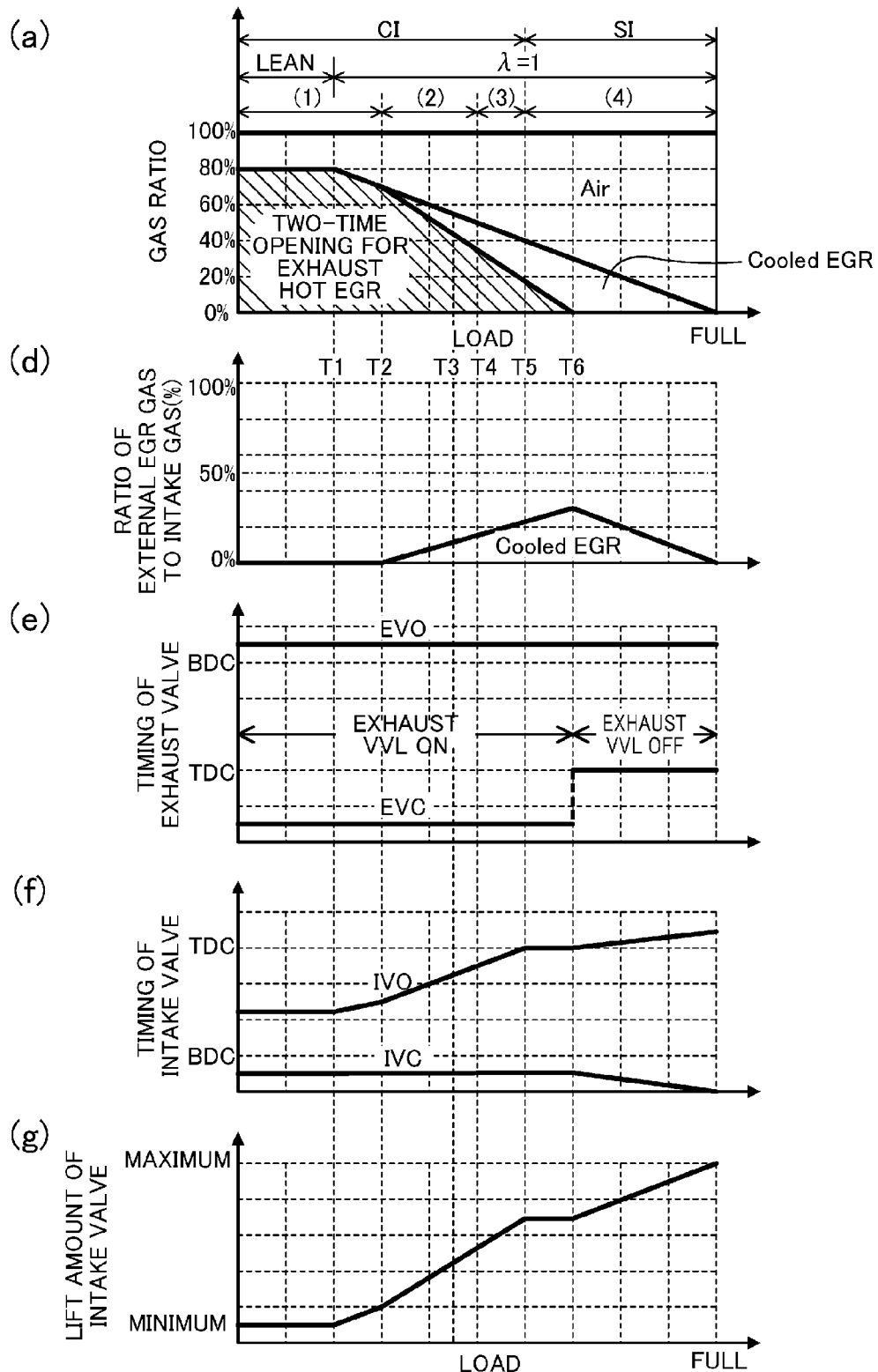
FIG. 20 illustrate (a) the gas composition in the cylinder, (d) the ratio of the external EGR gas to the intake gas, (e) the timing of an exhaust valve, (f) the timing of an intake valve, and (g) the lift amount of the intake valve, according to different engine loads in the spark-ignition direct-injection engine shown in FIG. 13.
Figure 21:
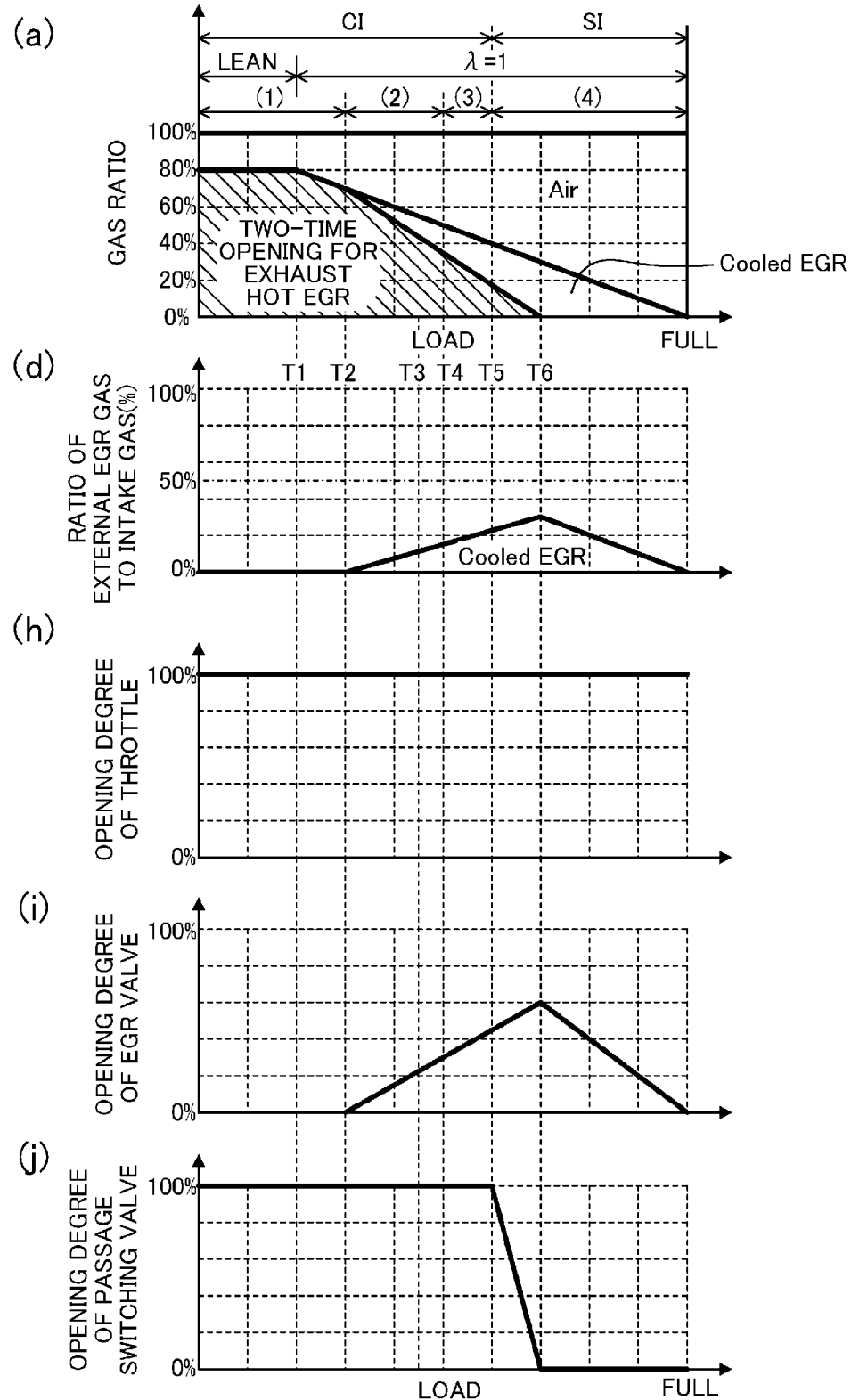
FIG. 21 illustrate changes in (a) the gas composition in the cylinder (d) the ratio of the external EGR gas to the intake gas, (h) the opening degree of a throttle, (i) the opening degree of an EGR valve, and (j) the opening degree of a passage switching valve, according to different engine loads in the spark-ignition direct-injection engine shown in FIG. 13.

Next, the control of the engine 100 with this configuration will be described hereinafter with reference to FIGS. 19-21. FIGS. 19-21 correspond to the above-described FIGS. 7-9. FIG. 19(a) illustrates the gas composition in a cylinder 18. FIG. 19(b) illustrates the temperature in the cylinder at the start of compression. FIG. 19(c) illustrates the oxygen concentration. FIG. 19(d) illustrates the ratio of the external EGR gas to the intake gas. FIGS. 19(b) and 19(c) correspond to FIGS. 7(b) and 7(c).

FIGS. 20(a) and 20(d) correspond to FIGS. 19(a) and 19(d), and illustrate the gas composition in the cylinder 18, and the ratio of external EGR gas to intake gas, respectively. FIG. 20(e) illustrates the opening and closing times of an exhaust valve 22. FIG. 20(f) illustrates the opening and closing times of an intake valve 21. FIG. 20(g) illustrates the lift amount of the intake valve.

FIGS. 21(a) and 21(d) correspond to FIGS. 19(a) and 19(d). FIG. 21(h) illustrates the opening degree of a throttle valve 36. FIG. 21(i) illustrates the opening degree of an EGR valve 511. FIG. 21(j) illustrates the opening degree of a passage switching valve 415.

The fuel injection and the ignition time in the engine 100 are controlled in the same manner as in the engine 1. See FIGS. 10(k), 10(l), and 10(m).

First, the control between a low load and a predetermined load T1 and between the predetermined loads T1 and T2 in FIG. 19(a) are the same as those in FIG. 7(a). However, as shown in FIG. 21(j), the opening degree of the passage switching valve 415 is set to the full-open. As a result, exhaust gas passes through the bypass passages 411, 412, and 413 and is exhausted. In this case, as will be described later, since no suck effect of the exhaust gas exhausted to the exhaust port 17 occurs, the two-time opening of the exhaust valve introduces a sufficient amount of the internal EGR gas into the cylinders 18.

FIGS. 7(a) and 7(e) show that the exhaust VVL 71 is turned off under a predetermined load T3 (see FIG. 8(e)). FIGS. 20(a) and 20(e) show that the exhaust VVL 71 is not turned off under the predetermined load T3 (see FIG. 20(e)). The exhaust VVL 71 is kept on to a predetermined load T6 of the SI mode.

As shown in FIGS. 20(f) and 20(g), in the higher range equal to or higher than the predetermined load T2, the lift amount of the intake valve 21 gradually increases with the increasing engine load. Accordingly, the opening time of the intake valve 21 is advanced. Then, the amount of the internal EGR gas to be introduced is gradually reduced with the increasing engine load by controlling the exhaust VVL 71 and the intake CVVL 73, as shown in FIG. 20(a). As such, since the operation of the exhaust VVL 71 is not stopped, there is no need to rapidly change the lift amount of the intake valve 21 (see FIG. 8(g)). As shown in FIG. 21(i), there is also no need to rapidly change the opening degree of the EGR valve 511 (see FIG. 9(i) as well). This improves the controllability with the increasing engine load. High pressure retarded injection is performed under the engine load equal to or higher than a predetermined load T4, which is similar to what has been described above (see FIGS. 9(k), 9(1), and 9(m)).

Under the engine load over a predetermined load T5, the CI mode is switched to the SI mode. As shown in FIG. 21(j), in the high load range over the predetermined load T5, the passage switching valve 415 is gradually closed from the full-open. This reduces the amount of the exhaust gas flowing through the bypass passages 411, 412, and 413, and increases the amount of the exhaust gas passing through the independent exhaust passages 401, 402, and 403 and flowing to the negative pressure generator 405. This strengthen the negative pressure generated inside the negative pressure generator 405, and sucks the exhaust gas exhausted to the exhaust port 17, thereby reducing the amount of the internal EGR gas returning to the inside of the cylinder 18 at the two-time opening of the exhaust valve. That is, when the negative pressure inside the negative pressure generator 405 becomes strong (i.e., when the pressure decreases), this negative pressure passes through the independent exhaust passages 401, 402, and 403 and reaches the exhaust port 17 to suck the exhaust gas downstream. As a result, this hardly causes recirculation of the exhaust gas from the exhaust ports 17 to the cylinder 18. Since the opening degree of the passage switching valve 415 decreases with the increasing engine load, the negative pressure generated in the negative pressure generator 35 gradually increases the suck effect (i.e., the ejector effect) of the exhaust gas. As a result, as shown in FIG. 21(*a*), the amount of the internal EGR gas gradually decreases.

Under the predetermined load T6, where the amount of the internal EGR gas to be introduced is set to zero, the opening degree of the passage switching valve 415 is fully closed as shown in FIG. 21(*j*), and the exhaust VVL 71 is turned off as shown in FIG. 20(*e*).

In the higher range equal to or higher than the predetermined load T6, the same control as in FIG. 7, etc., is basically performed. However, as shown in FIG. 21(*j*), the opening degree of the passage switching valve 415 is maintained to the full-close until reaching the full load range. Then, as described above, the full amount of the exhaust gas from the cylinder 18 flows into the negative pressure generator 405 to strengthen the negative pressure generated in the generator 405. In the high load range equal to and higher the predetermined load T6, the two-time opening of the exhaust valve is stopped. However, the strong negative pressure is utilized to suck (i.e., scavenge) the residual gas in the cylinder 18 in the exhaust stroke, in which the exhaust valve 22 is open, and contributes to increasing the amount of the filling fresh air and decreasing the temperature in the cylinder 18. This is advantageous in increasing the torque in the high load range.

Other Structure of Valve Gear

Figure 22:
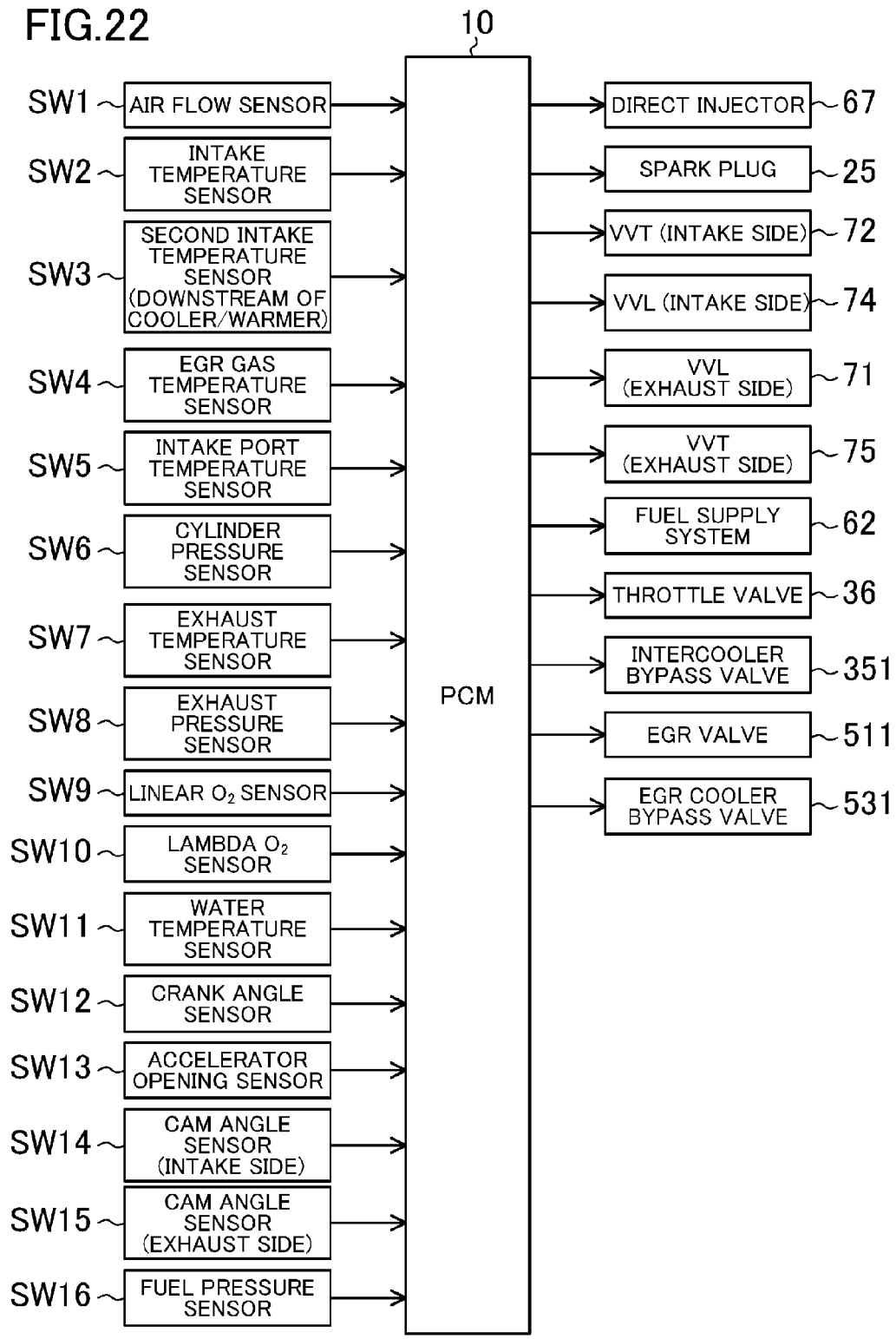
FIG. 22 is a block diagram illustrating the control of a spark-ignition direct-injection engine having a structure different from FIGS. 2 and 18.
Figure 24A:
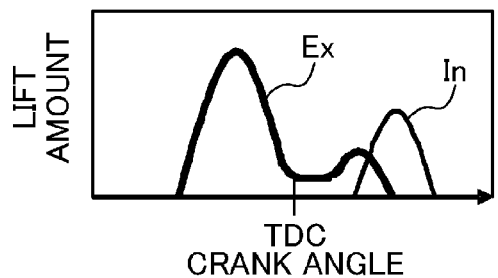
FIG. 24A illustrates opening characteristics of an intake valve and an exhaust valve in the load range from the lowest load to a load T1.
Figure 24B:
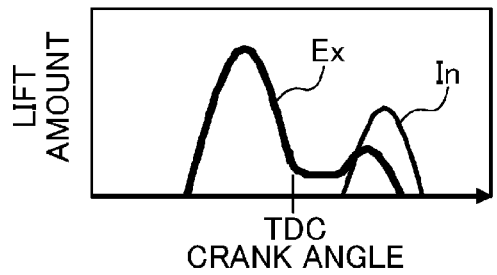
FIG. 24B illustrates opening characteristics of the intake valve and the exhaust valve in the load range from the load T1 to a load T3.
Figure 24C:
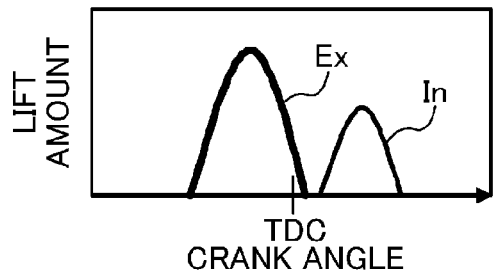
FIG. 24C illustrates opening characteristics of the intake valve and the exhaust valve in the load range from the load T3 to a load T5.
Figure 24D:
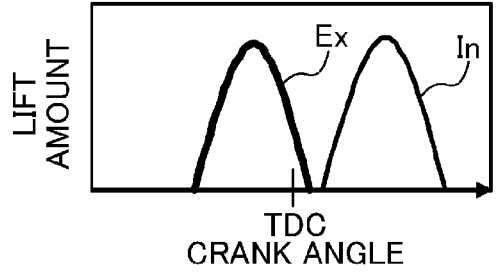
FIG. 24D illustrates opening characteristics of the intake valve and the exhaust valve in the load range from the load T5 to a load T6.
Figure 24E:
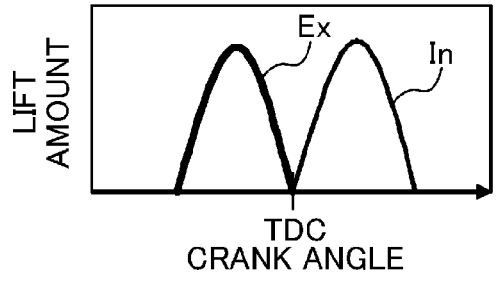
FIG. 24E illustrates opening characteristics of the intake valve and the exhaust valve in the higher load range over the load T6.

In FIG. 2, the valve gear of the intake valve 21 includes a CVVL 73. Different from this, as shown in FIG. 22, a valve gear of the intake valve 21 may include a VVL 74 in place of the CVVL 73, similar to the exhaust valve system. However, the intake-side VVL 74 is different from the exhaust-side VVL 71. The intake-side VVL 74 includes two types of cams having different cam profiles, a large lift cam relatively increasing the lift amount of the intake valve 21, and a small lift cam relatively decreasing the lift amount of the intake valve 21. The intake-side VVL 74 also includes a lost motion mechanism selectively transmitting the operating state of one of the large lift cam or the small lift cam to the intake valve 21. As shown in FIGS. 24A-24C, when the VVL 74 transmits the operating state of the small lift cam to the intake valve 21, the intake valve 21 is open with a relatively small lift amount for a short time. On the other hand, as shown in FIGS. 24D and 24E, when the VVL 74 transmits the operating state of the large lift cam to the intake valve 21, the intake valve 21 is open with a relatively large lift amount for a long time.

The valve gear of the exhaust valve 22 further includes a VVT 75 in addition to the VVL 71. Similar to the VVT 75 of the intake valve 21, the VVT 75 may have a known hydraulic, electromagnetic, or mechanical structure as appropriate.

Figure 23:
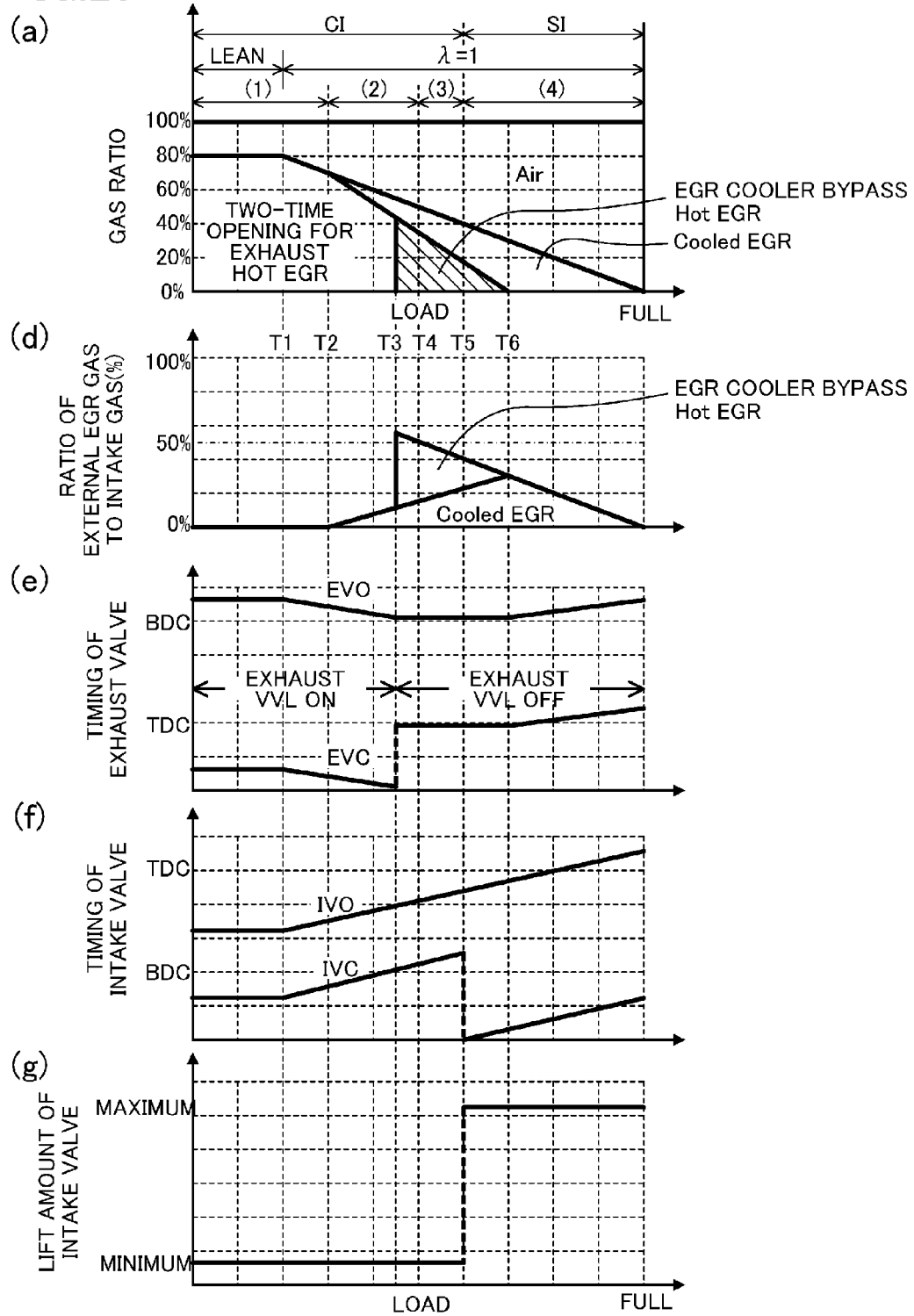
FIG. 23 illustrate changes in (a) the gas composition in a cylinder, (d) the ratio of external EGR gas to intake gas, (e) the timing of an exhaust valve, (f) the timing of an intake valve, and (g) the lift amount of the intake valve, according to different engine loads in the spark-ignition direct-injection engine shown in FIG. 22.

FIG. 23 illustrate control examples of parameters of the engine 1 according to the level of the engine load where the valve gear of the intake valve 21 includes the VVL 74. FIG. 23 correspond to FIG. 8.

In the CI mode, in the load range lower than the predetermined load T1, as shown in FIG. 23(*e*), the exhaust VVL 71 is turned on to perform the two-time opening of the exhaust valve, which opens the exhaust valve 22 in the intake stroke. As shown in FIG. 23(*g*), the intake VVL 74 opens and closes the intake valve 21 with the small lift cam. The opening time of the intake valve 21 is retarded (see FIG. 23(*f*)). FIG. 24A illustrates the lift characteristics of the intake valve 21 and the exhaust valve 22 in this state. Then, the internal EGR ratio is set to the highest value of, for example, about 80%.

In the range between the predetermined loads T1 and T3, as shown in FIG. 23(*e*), the exhaust VVL 71 is kept on to continue the two-time opening of the exhaust valve. As shown in FIG. 23(*g*), the intake VVL 74 opens and closes the intake valve 21 with the small lift cam. As shown in FIG. 23(*e*), the opening time of the exhaust valve 22 is retarded with the increasing engine load. On the other hand, as shown in FIG. 23(*f*), the opening time of the intake valve 21 is advanced with the increasing engine load. FIG. 24B illustrates the lift characteristics of the intake valve 21 and the exhaust valve 22 in this state. As such, the overlap between the opening period of the intake valve 21 and the opening period of the exhaust valve 22 changes with the increasing engine load, thereby reducing the internal EGR ratio (see FIG. 23(*a*)).

In the range between the predetermined loads T3 and T5, first under the predetermined load T3, the exhaust VVL 72 is turned off to stop the two-time opening of the exhaust valve (see FIG. 23(*e*)). FIG. 24C illustrates the lift characteristics of the intake valve 21 and the exhaust valve 22 in this state. In the engine shown in FIG. 22, the valve gears of the intake valve 21 and the exhaust valve 22 include a VVT72 and a VVT 75 to adjust the opening times of the valves 21 and 22, respectively. There is thus no need to rapidly change the opening operation of the intake valve 21 when the exhaust VVL 72 is turned off under the predetermined load T3. The intake valve 21 still uses the small lift cam to advance the opening time with the increasing engine load. The opening time of the exhaust valve 22 is not advanced and fixed. As described above, the external EGR gas is introduced into the cylinder 18, and the amount of the fresh air is increased with the increasing engine load. In the range equal to or higher than the predetermined load T4, the high pressure retarded injection is executed as described above.

In the range between the predetermined loads T5 and T6, under the predetermined load T5, the exhaust VVL 72 is kept off, and the VVL 74 of the intake valve 21 is switched from the small lift cam to the large lift cam (see FIG. 23(*g*)). FIG. 24D illustrates the lift characteristics of the intake valve 21 and the exhaust valve 22 in this state. As shown in FIG. 23(*f*), the opening time of the intake valve 21 is fixed and the closing time is retarded. Then, the opening time of the intake valve 21 advances with the increasing engine load. On the other hand, the opening time of the exhaust valve 22 is not advanced and fixed. This introduces the external EGR gas into the cylinder 18, and increases the amount of the fresh air with the increasing engine load.

In the high load range equal to or higher than the predetermined load T6, the exhaust VVL 72 is kept off, and the VVL 74 of the intake valve 21 still uses the large lift cam to advance the opening times of both of the intake valve 21 and the exhaust valve 22 with the increasing engine load. FIG. 24E illustrates the lift characteristics of the intake valve 21 and the exhaust valve 22 in this state. This reduces the EGR ratio of the external EGR to zero, and increases the amount of the fresh air.

The technique disclosed herein is not limited to the application for the above-described engine. For example, in the intake stroke, the fuel may be injected into the intake port 16 not via the injector 67 in the cylinder 18 but via an extra port injector in the intake port 16.

The engine 1 is not limited to the straight 4-cylinder engine, but may be a straight 3-cylinder engine, a straight 2-cylinder engine, a straight 6-cylinder engine, etc. The engine 1 may also be various types of engines such as a V6-cylinder engine, a V8-cylinder engine, and a horizontally opposed four-cylinder engine.

While in this description, the air-fuel ratio of the mixture is set to the stoichiometric air-fuel ratio ($\lambda \approx 1$) in the predetermined operation range, the air-fuel mixture may be lean. The stoichiometric air-fuel ratio enables utilization of a three-way catalyst.

The operation range shown in FIG. 4 is the mere example, and other various operation ranges may be provided.

The high pressure retarded injection may be divided as appropriate. Similarly, the intake stroke injection may be divided as appropriate. In these divided injections, the fuel may be injected in the intake stroke and in the compression stroke.

DESCRIPTION OF REFERENCE CHARACTERS

1 Engine (Engine Body)
10 PCM (Controller)
18 Cylinder
25 Spark Plug
50 EGR Passage (Exhaust Recirculation System)
51 Main Passage (Exhaust Recirculation System)
511 EGR Valve (Exhaust Recirculation System)
52 EGR Cooler (Exhaust Recirculation System)
53 EGR Cooler Bypass Passage (Exhaust Recirculation System)
531 EGR Cooler Bypass Valve (Exhaust Recirculation System)
62 Fuel Supply System (Fuel Pressure Setting Mechanism)
67 Injector (Fuel Injection Valve)
71 VVL (Exhaust Recirculation System)

The invention claimed is:

1. A spark-ignition direct-injection engine comprising:
an engine body including a cylinder with a geometrical compression ratio of 15 or higher;
a fuel injection valve configured to inject fuel into the cylinder;
a fuel pressure setting mechanism configured to set a pressure of the fuel injected by the fuel injection valve;
a spark plug facing an inside of the cylinder and configured to ignite an air-fuel mixture in the cylinder;
an exhaust recirculation system configured to introduce exhaust gas into the cylinder; and
a controller configured to operate the engine body by controlling at least the fuel injection valve, the fuel pressure setting mechanism, the spark plug, and the exhaust recirculation system, wherein
the controller is programmed to
operate the engine body by compression ignition combustion of compressing and igniting the air-fuel mixture in the cylinder, when an operating mode of the engine body is in a predetermined low load range, and
activate the spark plug at a predetermined timing to operate the engine body by spark ignition combustion, when the operating mode of the engine body is in a high load range, in which a load is higher than that in the low load range, and
the controller is programmed to
set the pressure of the fuel to a high fuel pressure of 30 MPa or higher using the fuel pressure setting mechanism, and drive the fuel injection valve to inject the fuel into the cylinder at least in a period between a terminal stage of a compression stroke and an initial stage of an expansion stroke, when the operating mode of the engine body is at least in a predetermined first specified sub-range of the low load range including a boundary between the low load range and the high load range, and
set the pressure of the fuel to the high fuel pressure of 30 MPa or higher using the fuel pressure setting mechanism, drive the fuel injection valve to inject the fuel into the cylinder at least in the period between the terminal stage of the compression stroke and the initial stage of the expansion stroke, and drive the spark plug after an end of fuel injection to perform the spark ignition of the air-fuel mixture in the cylinder, when the operating mode of the engine body is at least in a predetermined second specified sub-range of the high load range including a full load range, and
the controller is programmed to set an EGR ratio, which is a ratio of an amount of the exhaust gas to an entire amount of gas in the cylinder, in the first specified sub-range of the low load range to be higher than an EGR ratio in the second specified sub-range of the high load range by controlling the exhaust recirculation system, and advances start of the fuel injection in the first specified sub-range to start of the fuel injection in the second specified sub-range.

2. A spark-ignition direct-injection engine comprising:
an engine body including
a cylinder with a geometrical compression ratio of 15 or higher, and
a piston reciprocally inserted in the cylinder, and having a crown surface with a recessed cavity;
a fuel injection valve capable of injecting fuel into the cavity when the piston is near a compression top dead center;
a fuel pressure setting mechanism configured to set a pressure of the fuel injected by the fuel injection valve;
a spark plug facing an inside of the cylinder and configured to ignite an air-fuel mixture in the cylinder;
an exhaust recirculation system configured to introduce exhaust gas into the cylinder; and
a controller configured to operate the engine body by controlling at least the fuel injection valve, the fuel pressure setting mechanism, the spark plug, and the exhaust recirculation system, wherein
the controller is programmed to
operate the engine body by compression ignition combustion of compressing and igniting the air-fuel mixture in the cylinder, when an operating mode of the engine body is in a predetermined low load range, and
activate the spark plug at predetermined timing to operate the engine body by spark ignition combustion, when the operating mode of the engine body is in a high load range, in which a load is higher than that in the low load range, in which the compression ignition combustion is performed, and
the controller is programmed to
set the pressure of the fuel to a high fuel pressure of 30 MPa or higher using the fuel pressure setting mechanism, and drive the fuel injection valve at timing of injecting the fuel into the cavity of the piston, when the operating mode of the engine body is at least in a predetermined first specified sub-range of the low load range including a boundary between the low load range and the high load range, and
set the pressure of the fuel to the high fuel pressure of 30 MPa or higher using the fuel pressure setting mechanism, drives the fuel injection valve at the timing of injecting the fuel into the cavity of the piston, and drives the spark plug after an end of fuel injection to perform the spark ignition of the air-fuel mixture in the cylinder, when the operating mode of the engine body is at least in a predetermined second specified sub-range of the high load range including a full load range, and the controller is programmed to set an EGR ratio, which is a ratio of an amount of the exhaust gas to an entire amount of gas in the cylinder, in the first specified sub-range of the low load range to be higher than the EGR ratio in the second specified sub-range of the high load range by controlling the exhaust recirculation system, and advances start of the fuel injection in the first specified sub-range to start of the fuel injection in the second specified sub-range.

3. The spark-ignition direct-injection engine of claim 1, wherein the exhaust recirculation system includes an external EGR system configured to recirculate the exhaust gas into the cylinder via the EGR passage through which an exhaust passage of the engine body communicates to an intake passage, and an internal EGR system configured to recirculate the exhaust gas into the cylinder by opening and closing control of an intake valve and an exhaust valve of the engine body, and the controller is programmed to introduce cooled exhaust gas into the cylinder via the EGR passage of the external EGR system in the first specified sub-range of the low load range.

4. The spark-ignition direct-injection engine of claim 1, wherein the exhaust recirculation system is capable of introducing, into a cylinder, cooled EGR gas obtained by cooling the exhaust gas, and hot EGR gas having a higher temperature than the cooled EGR gas, and the controller is programmed to introduce at least the cooled EGR gas into the cylinder via the exhaust recirculation system in the first specified sub-range of the low load range, and introduces only the hot EGR gas into the cylinder via the exhaust recirculation system in a predetermined lowest load sub-range of the low load range, in which the load is lower than that in the first specified sub-range.

5. The spark-ignition direct-injection engine of claim 1, wherein the controller is programmed to drive the fuel injection valve to inject the fuel at least in a period between an intake stroke and a middle of the compression stroke in a sub-range of the low load range other than the first specified sub-range, and in a high speed range of the high load range, in which a rotational speed is equal to or higher than a predetermined speed.

6. The spark-ignition direct-injection engine of claim 5, wherein the controller is programmed to set the pressure of the fuel to be lower than 30 MPa using the fuel pressure setting mechanism at least in the sub-range of the low load range other than the first specified sub-range.

7. The spark-ignition direct-injection engine of claim 6, wherein the fuel pressure setting mechanism includes a fuel pump driven by the engine body and configured to adjust the pressure of the fuel.

8. The spark-ignition direct-injection engine of claim 1, wherein the fuel injection valve is located on a central axis of the cylinder and capable of radially injecting the fuel.

9. The spark-ignition direct-injection engine of claim 2, wherein the exhaust recirculation system includes an external EGR system configured to recirculate the exhaust gas into the cylinder via the EGR passage through which an exhaust passage of the engine body communicates to an intake passage, and an internal EGR system configured to recirculate the exhaust gas into the cylinder by opening and closing control of an intake valve and an exhaust valve of the engine body, and the controller is programmed to introduce cooled exhaust gas into the cylinder via the EGR passage of the external EGR system in the first specified sub-range of the low load range.

10. The spark-ignition direct-injection engine of claim 2, wherein the exhaust recirculation system is capable of introducing, into a cylinder, cooled EGR gas obtained by cooling the exhaust gas, and hot EGR gas having a higher temperature than the cooled EGR gas, and the controller is programmed to introduce at least the cooled EGR gas into the cylinder via the exhaust recirculation system in the first specified sub-range of the low load range, and introduces only the hot EGR gas into the cylinder via the exhaust recirculation system in a predetermined lowest load sub-range of the low load range, in which the load is lower than that in the first specified sub-range.

11. The spark-ignition direct-injection engine of claim 1, wherein the controller is programmed to set the pressure of the fuel to be lower than 30 MPa using the fuel pressure setting mechanism at least in the sub-range of the low load range other than the first specified sub-range.

12. The spark-ignition direct-injection engine of claim 11, wherein the fuel pressure setting mechanism includes a fuel pump driven by the engine body and configured to adjust the pressure of the fuel.

13. The spark-ignition direct-injection engine of claim 2, wherein the fuel injection valve is located on a central axis of the cylinder and capable of radially injecting the fuel.

14. The spark-ignition direct-injection engine of claim 2, wherein the fuel injection valve is located on a central axis of the cylinder and capable of radially injecting the fuel.

15. A spark-ignition direct-injection engine comprising:

an engine body including a cylinder with a geometrical compression ratio of 15 or higher;

a fuel injection valve configured to inject fuel into the cylinder;

a fuel pressure setting mechanism configured to set a pressure of the fuel injected by the fuel injection valve;

a spark plug facing an inside of the cylinder and configured to ignite an air-fuel mixture in the cylinder;

an exhaust recirculation system configured to introduce exhaust gas into the cylinder; and a controller configured to operate the engine body by controlling at least the fuel injection valve, the fuel pressure setting mechanism, the spark plug, and the exhaust recirculation system, wherein the controller is programmed to operate the engine body by compression ignition combustion of compressing and igniting the air-fuel mixture in the cylinder, when an operating mode of the engine body is in a predetermined low load range, and activate the spark plug at predetermined timing to operate the engine body by spark ignition combustion, when the operating mode of the engine body is in a high load range, in which a load is higher than that in the low load range, and the controller is programmed to set the pressure of the fuel to a high fuel pressure of 30 MPa or higher using the fuel pressure setting mechanism, and drive the fuel injection valve to inject the fuel into the cylinder without injecting the fuel in an intake stroke in a period between a terminal stage of a compression stroke and an initial stage of an expansion stroke, when the operating mode of the engine body is at least in a predetermined first specified sub-range of the low load range including a boundary between the low load range and the high load range, and set the pressure of the fuel to the high fuel pressure of 30 MPa or higher using the fuel pressure setting mechanism, drive the fuel injection valve to inject the fuel into the cylinder without injecting the fuel in an intake stroke in the period between the terminal stage of the compression stroke and the initial stage of the expansion stroke, and drive the spark plug after an end of fuel injection to perform the spark ignition of the air-fuel mixture in the cylinder, when the operating mode of the engine body is at least in a predetermined second specified sub-range of the high load range including a full load range, and the controller is programmed to set an EGR ratio, which is a ratio of an amount of the exhaust gas to an entire amount of gas in the cylinder, in the first specified sub-range of the low load range to be higher than an EGR ratio in the second specified sub-range of the high load range by controlling the exhaust recirculation system, and advance start of the fuel injection in the first specified sub-range to start of the fuel injection in the second specified sub-range.

16. A spark-ignition direct-injection engine comprising:

an engine body including a cylinder;

a fuel injection valve configured to inject fuel into the cylinder;

a spark plug facing an inside of the cylinder and configured to ignite an air-fuel mixture in the cylinder; and a controller configured to operate the engine body by controlling at least the fuel injection valve, and the spark plug, wherein the controller is programmed to operate the engine body by compression ignition combustion of compressing and igniting the air-fuel mixture in the cylinder, when an operating mode of the engine body is in a first range, and activate the spark plug at predetermined timing to operate the engine body by spark ignition combustion, when the operating mode of the engine body is in a second range, and the controller is programmed to drive the fuel injection valve to inject the fuel into the cylinder at least in a period between a terminal stage of compression stroke and an initial stage of an expansion stroke, when the operating mode of the engine body is in the first range, and drive the fuel injection valve to inject the fuel into the cylinder at least in the period between the terminal stage of the compression stroke and the initial stage of the expansion stroke, and drive the spark plug after an end of fuel injection to perform the spark ignition of the air-fuel mixture in the cylinder, when the operating mode of the engine body is in the second range, and the controller is programmed to advance start of the fuel injection in the first range to start of the fuel injection in the second range.

* * * * *